(12) United States Patent
Kwon et al.

(10) Patent No.: US 10,389,478 B2
(45) Date of Patent: Aug. 20, 2019

(54) ELECTRONIC DEVICE AND COVERAGE COMPENSATION METHOD THEREOF FOR SHORT RANGE COMMUNICATION

(71) Applicant: Samsung Electronics Co., Ltd., Suwon-si, Gyeonggi-do (KR)

(72) Inventors: Junsik Kwon, Yongin-si (KR); Daehui Kang, Suwon-si (KR); Chunho Park, Seoul (KR); Yunsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/938,972

(22) Filed: Mar. 28, 2018

(65) Prior Publication Data

US 2018/0287733 A1 Oct. 4, 2018

(30) Foreign Application Priority Data

Mar. 29, 2017 (KR) .................. 10-2017-0040191

(51) Int. Cl.
*H04W 52/26* (2009.01)
*H04L 1/00* (2006.01)
(Continued)

(52) U.S. Cl.
CPC .......... *H04L 1/0013* (2013.01); *H04L 1/0003* (2013.01); *H04L 27/262* (2013.01);
(Continued)

(58) Field of Classification Search
CPC ... H04L 1/0003; H04L 1/0013; H04L 27/262; H04W 52/267; H04W 52/283; H04W 4/80
See application file for complete search history.

(56) References Cited

U.S. PATENT DOCUMENTS 6,944,402 B1 * 9/2005 Baker ............... H04B 10/1143
398/118
7,257,094 B2 * 8/2007 Shoemake ........... H04L 1/0002
370/311
(Continued)

FOREIGN PATENT DOCUMENTS

KR 10-2014-0115898 A 10/2014

OTHER PUBLICATIONS

Extended European Search Report regarding Application No. 18164487.3, dated Jun. 8, 2018, 9 pages.
(Continued)

*Primary Examiner* — Siu M Lee

(57) ABSTRACT

An electronic device and communication coverage compensation method thereof for use in short range communication. An electronic device includes a housing, a radio communication circuit arranged in the housing and configured to support radio communication with a neighboring electronic device, a processor arranged in the housing and electrically connected to the radio communication circuit, a memory arranged in the housing and electrically connected to the processor, the memory storing instructions that, when executed by the processor, cause the processor to communicate with the neighboring electronic device with the radio communication circuit, change, when detecting an event triggering a change from a first symbol rate to a second symbol rate, from the first symbol rate to the second symbol rate, determine a compensation value based on a coverage range, and adjust a transmit power of the radio communication circuit based on the compensation value.

20 Claims, 15 Drawing Sheets

(51) Int. Cl.
*H04W 52/28* (2009.01)
*H04W 4/80* (2018.01)
*H04L 27/26* (2006.01)

(52) U.S. Cl.
CPC .......... *H04W 4/80* (2018.02); *H04W 52/267* (2013.01); *H04W 52/283* (2013.01)

(56) References Cited

U.S. PATENT DOCUMENTS

| | | | |
|---|---|---|---|
| 2014/0086125 A1 | 3/2014 | Polo et al. | |
| 2014/0285143 A1 | 9/2014 | Kwon et al. | |
| 2014/0331990 A1* | 11/2014 | Zimmer | G01F 23/14 126/640 |
| 2015/0111589 A1* | 4/2015 | Yavuz | H04W 52/343 455/452.1 |
| 2016/0142177 A1 | 5/2016 | Chou et al. | |
| 2018/0183489 A1* | 6/2018 | Rasmussen | H04B 1/711 |
| 2018/0198559 A1* | 7/2018 | Lopez | H04L 1/0064 |

OTHER PUBLICATIONS

Woolley, "Exploring Bluetooth 5—Going the Distance", Bluetooth blog, Feb. 13, 2017, 13 pages. http://blog.bluetooth.com/exploring-bluetooth-5-going-the-distance.

\* cited by examiner

ELECTRONIC DEVICE AND COVERAGE COMPENSATION METHOD THEREOF FOR SHORT RANGE COMMUNICATION

CROSS-REFERENCE TO RELATED APPLICATIONS AND CLAIM OF PRIORITY

This application claims priority under 35 U.S.C. § 119(a) to Korean Patent Application No. 10-2017-0040191, filed on Mar. 29, 2017 in the Korean Intellectual Property Office, the entire disclosure of which is incorporated herein by reference.

TECHNICAL FIELD

The present disclosure relates to an electronic device and coverage compensation method thereof for short range communication.

BACKGROUND

Bluetooth is one of the short-range wireless communications technologies making it possible for real-time data communication between electronic devices. Since the development of Bluetooth, many versions of Bluetooth standards have been released, and the standardization of low-power communication solutions has increased the application fields of Bluetooth. As with other communication technologies, in Bluetooth communication a data rate, low power consumption, and coverage extension are important factors.

In comparison with the legacy Bluetooth (BT), Bluetooth low energy (BLE) as an extension of Bluetooth focused on low power is attracting growing interest in terms of its low-power, low-cost, simplicity, and compact design.

Bluetooth devices have respective communication coverage ranges determined according to their specifications and may communicate among each other in overlapping coverage. For example, Bluetooth devices may be manufactured with different Bluetooth chips to meet device-specific hardware requirements. Because of the difference in Bluetooth chip and mechanical characteristics (e.g., antenna and metal housing), the data communication specifications (e.g., coverage range) of the Bluetooth devices may be different. For example, a communication standard (e.g. 1M physical layer (Phy)) may have a coverage range that is greater than that of a second communication standard (e.g., 2M Phy) and a data rate that is less than that of the second communication standard.

It may be that a physical layer protocol changes between two Bluetooth devices in communication, resulting in Bluetooth channel breakdown and data communication failure.

If a predetermined condition is fulfilled in the course of communication between two Bluetooth devices at the symbol rate of 1M sym/s, it may be possible to change the physical layer protocol to increase the symbol rate to 2M sym/s. In this case, if one of the two Bluetooth devices is out of the coverage range of the other for data communication at the symbol rate of 2M sym/s, the communication channel is broken down. For example, it may be possible for a device entered in the 1M sym/s communication coverage range of another device to receive a first information through a 1M sym/s communication channel and then want to receive a second information (e.g., advertisement information) through the 2M sym/s communication channel. However, if the device is out of the 2M sym/s communication coverage range of another device, it cannot receive the second information.

SUMMARY

The present disclosure provides a Bluetooth communication method of an electronic device that is capable of seamless Bluetooth communication with another electronic device in such a way that the electronic device makes a decision to change a symbol rate type and determine a compensation value for compensating a change of communication specifications caused by the change of the symbol rate type.

In accordance with an aspect of the present disclosure, an electronic device is provided. The electronic device includes a housing; a radio communication circuit arranged in the housing and configured to support radio communication with a neighboring electronic device; at least one processor arranged in the housing and electrically connected to the radio communication circuit; and a memory arranged in the housing and electrically connected to the at least one processor, the memory storing instructions, executable by the at least one processor, to communicate with the neighboring electronic device with the radio communication circuit at a first symbol rate, change, when detecting an event triggering a change from the first symbol rate to a second symbol rate, from the first symbol rate to the second symbol rate, determine a compensation value based on a coverage range defined by data propagation distance at the second symbol rate, and adjust a transmit power of the radio communication circuit based on the compensation value.

In accordance with another aspect of the present disclosure, an electronic device is provided. The electronic device includes a housing; a radio communication circuit arranged in the housing and configured to support radio communication with a neighboring electronic device; at least one processor arranged in the housing and electrically connected to the radio communication circuit; and a memory arranged in the housing and electrically connected to at least one processor, the memory storing instructions, executable by the at least one processor, to control the radio communication circuit for Bluetooth low energy (BLE) communication with a neighboring electronic device at a default symbol rate, change, when a data rate change event is detected, from the default symbol rate to a non-default symbol rate, determine a compensation value based on a coverage range defined by data propagation distance at the non-default symbol rate, and adjust the transmit power of the radio communication circuit based on the compensation value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
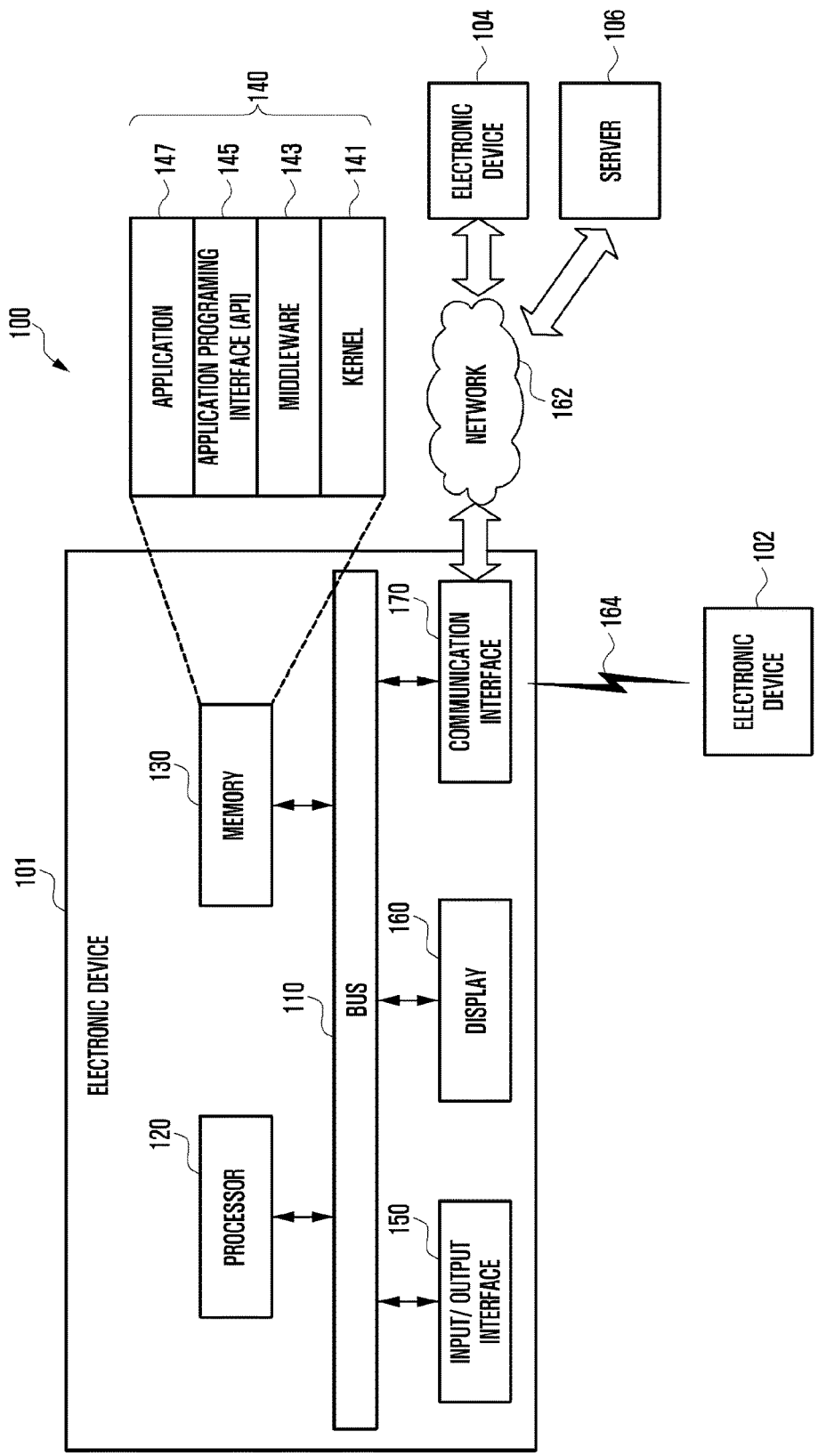
FIG. 1 is a diagram illustrating electronic devices in a network environment according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that the present disclosure is not limited to the specific embodiments described hereinafter, but includes various modifications, equivalents, and/or alternatives of the embodiments of the present disclosure. In the drawings, similar drawing reference numerals may be used for similar constituent elements. A singular expression may include a plural expression unless specially described.

In the description, the term "A or B" or "at least one of A and/or B" includes all possible combinations of words enumerated together. The terms "first" and "second" may describe various constituent elements, but they do not limit the corresponding constituent elements. For example, the above-described terms do not limit the order and/or importance of the corresponding constituent elements, but may be used to differentiate a constituent element from other constituent elements. When it is described that an (e.g., first) element is "connected" or "coupled" to another (e.g., second) element (e.g., functionally or communicatively), the element may be "directly connected" to the other element or "connected" to the other element through another (e.g., third) element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram illustrating a network environment 100 including an electronic device 101, according to an embodiment of the present disclosure. The electronic device 101 includes a bus 110, a processor 120, a memory 130, an input/output (I/O) interface 150, a display 160, and a communication interface 170.

The bus 110 may be a circuit connecting the above described components and transmitting communication (e.g., a control message) between the above described components. The processor 120 may receive commands from other components (e.g., the memory 130, the input/output interface 150, the display 160, or the communication interface 170) through the bus 110, analyze the received commands, and execute calculation or data processing according to the analyzed commands.

The memory 130 may store commands or data received from the processor 120 or other components (e.g., the input/output interface 150, the display 160, or the communication interface 170) or generated by the processor 120 or other components. The memory 130 may include programming modules, for example, a kernel 141, middleware 143, an Application Programming Interface (API) 145, or an application 147. Each of the aforementioned programming modules may be implemented by software, firmware, hardware, or a combination of two or more thereof.

The kernel 141 may control or manage system resources (e.g., the bus 110, processor 120, memory 130, etc.) used to execute operations or functions of the programming modules, e.g., the middleware 143, API 145, and application 147. The kernel 141 may also provide an interface that may access and control/manage the components of the electronic device 101 via the middleware 143, API 145, and application 147.

The middleware 143 may make it possible for the API 145 or application 147 to perform data communication with the kernel 141. The middleware 143 may also perform control operations (e.g., scheduling, load balancing) for task requests transmitted from the API 145 by methods, e.g., a method for assigning the order of priority to use the system resources (e.g., the bus 110, processor 120, memory 130, etc.), of the electronic device 101 to the application 147.

The API 145 is the interface for the application 147 to control the function provided by the kernel 141 or the middleware 143 and may include at least one interface or function (e.g. command) for file control, window control, image control, or text control.

The I/O interface 150 may receive a command or data as input from a user via in-output apparatus (e.g., sensor, keyboard, or touchscreen, or the like) and may deliver the received command or data to the processor 120 or the memory 130 through the bus 110. The I/O interface 150 may display a video, an image, data, or the like to the user.

The display 160 may be a liquid crystal display (LCD), an active matrix organic light emitting diode (AM-OLED) display, microelectromechanical systems (MEMS), electronic paper display and the like. The display 160 may include the touch panel. The display 160 may display the received various information (e.g., multi-media data, text data) from the above-described elements.

The communication interface 170 may connect communication between the electronic device 101 and an electronic device 104 or server 106. For example, the communication interface 170 may access a network 162 through wireless or wired communication to communicate with the external device. The wireless communication may include at least one of wireless-fidelity (WiFi), Bluetooth (BT), near field communication (NFC), a global positioning system (GPS), or cellular communication (e.g., long-term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), or a plain old telephone service (POTS).

The wireless communication may include global navigation satellite system (GNSS). The GNSS may include at least one of, for example, a global positioning system (GPS), a global navigation satellite system (Glonass), a navigation satellite system (Beidou), or a European global satellite-based navigation system (Galileo), according to a use area, a bandwidth, or the like.

According to an embodiment, the wireless communication includes a short range wireless communication 164, such as WiFi, BT, BT low energy (BLE), NFC, or the like. The communication interface 170 may connect communication between the electronic device 101 and an electronic device 102 through the short rage wireless communication 164.

Figure 2:
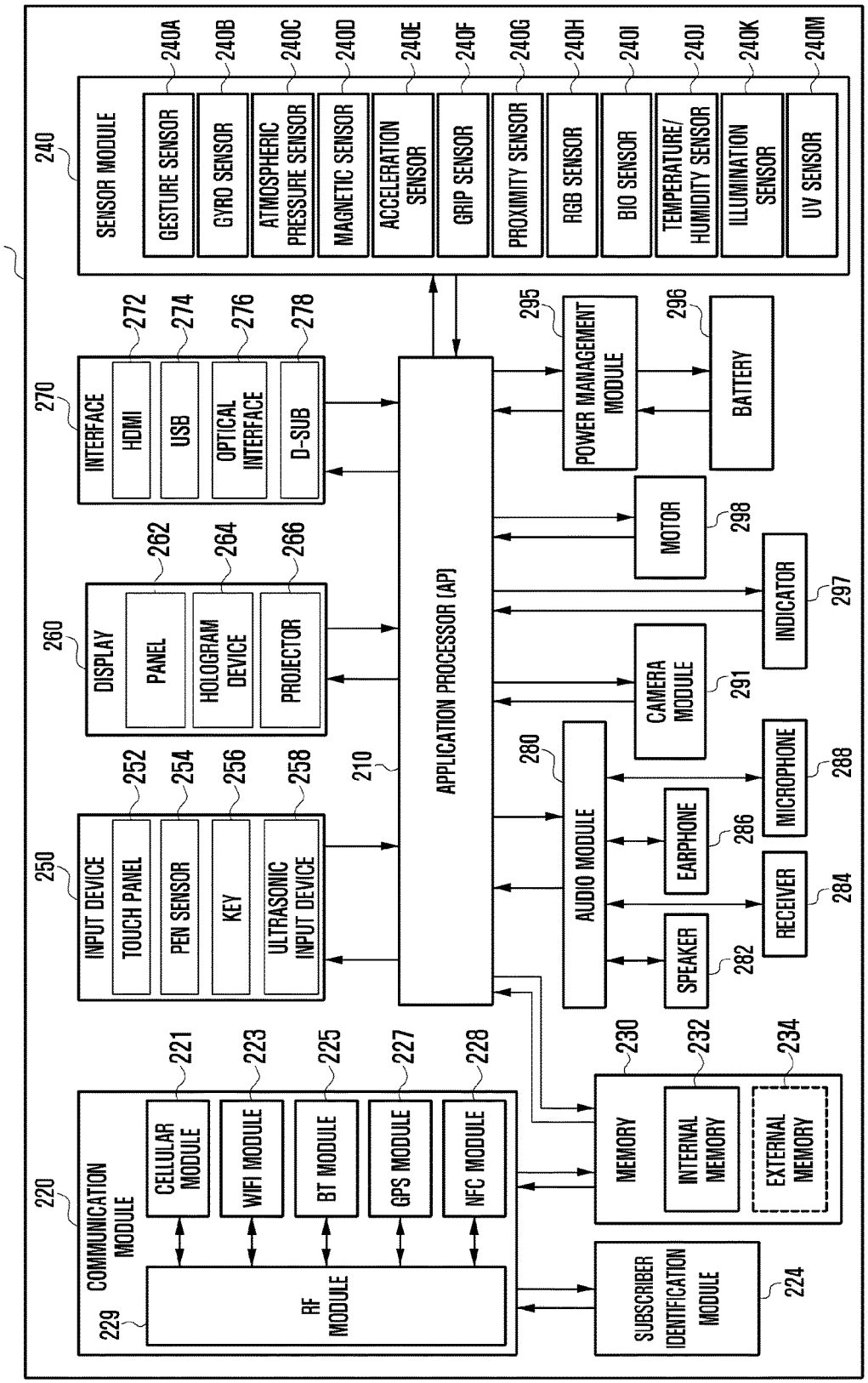
FIG. 2 is a block diagram illustrating a configuration of an electronic device according to various embodiments of the present disclosure.

FIG. 2 is a block diagram illustrating an electronic device 201, according to an embodiment of the present disclosure. The electronic device 201 may include some or all of the parts of the electronic device 101 illustrated in FIG. 1. The electronic device 201 may include one or more application processors (APs) 210, a communication module 220, a subscriber identification module (SIM) 224, a memory 230, a sensor module 240, an input device 250, a display 260, an interface 270, an audio module 280, a camera module 291, a power managing module 295, a battery 296, an indicator 297, and a motor 298.

The AP 210 operates an operation system or an application program so as to control a plurality of hardware or software component elements connected to the AP 210 and execute various data processing and calculations including multimedia data. The AP 210 may be implemented by a System on Chip (SoC). The AP 210 may further include a graphic processing unit (GPU).

The communication module 220 may transmit/receive data in communication between different electronic devices (e.g., the electronic device 104 and the server 106 connected to the electronic device 201) through a network. The communication module 220 may include a cellular module 221, a WiFi module 223, a BT module 225, a GPS module 227, an NFC module 228, and a radio frequency (RF) module 229.

The cellular module 221 may provide a voice call, a video call, a short message service (SMS), or an Internet service through a communication network (e.g., LTE, LTE-A, CDMA, WCDMA, UMTS, WiBro, GSM or the like). Further, the cellular module 221 may distinguish and authenticate electronic devices within a communication network by using the SIM 224. The cellular module 221 may perform at least some of the functions which can be provided by the AP 210 and may perform at least some of the multimedia control functions.

The cellular module 221 may include a communication processor (CP), and may be implemented by an SoC.

Although the components such as the cellular module 221 (e.g., a CP), the memory 230, and the power managing module 295 are illustrated as components separated from the AP 210 in FIG. 2, the AP 210 may include at least some (e.g., cellular module 221) of the aforementioned components in one embodiment.

The AP 210 or the cellular module 221 may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include a process for processing data transmitted/received through the corresponding module. Although the cellular module 221, the WiFi module 223, the BT module 225, the GPS module 227, and the NFC module 228 are illustrated as blocks separated from each other in FIG. 2, at least some (e.g., two or more) of the cellular module 221, the WiFi module 223, the BT module 225, the GPS module 227, and the NFC module 228 may be included in one integrated chip (IC) or one IC package. For example, at least some (e.g., the CP corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 may transmit/receive data, e.g., an RF signal. Although not illustrated, the RF module 229 may include a transceiver, a power amplifier module (PAM), a frequency filter, a low noise amplifier (LNA) or the like. Further, the RF module 229 may further include a component for transmitting/receiving electronic waves over a free air space in wireless communication, e.g., a conductor, a conducting wire or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module.

The SIM 224 may be inserted into a slot formed in a particular portion of the electronic device 201. The SIM 224 may include unique identification information (e.g., integrated circuit card identifier (ICCID)) or subscriber information (e.g., international mobile subscriber identity (IMSI).

The memory 230 may include an internal memory 232 or an external memory 234. The internal memory 232 may include at least one of a volatile memory (e.g., a dynamic random access memory (DRAM), a static RAM (SRAM), a synchronous dynamic RAM (SDRAM), and the like), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

The internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 201 through various interfaces. The electronic device 201 may further include a storage device (or storage medium) such as a hard drive.

The sensor module 240 may measure a physical quantity or detect an operation state of the electronic device 201, and convert the measured or detected information to an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination sensor 240K, and an ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling one or more sensors included in the sensor module 240.

The input device 250 may include a touch panel 252, a (digital) pen sensor 254, a key 256, or an ultrasonic input device 258. The touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 may provide a tactile reaction to the user.

The (digital) pen sensor 254 may be implemented using a method identical or similar to a method of receiving a touch input of the user, or using a separate recognition sheet. The key 256 may include a physical button, an optical key, or a key pad. The ultrasonic input device 258 is a device which can detect an acoustic wave by a microphone 288 of the electronic device 201 through an input means generating an ultrasonic signal to identify data and can perform wireless recognition. The electronic device 201 may receive a user input from an external device (e.g., computer or server) connected to the electronic device 201 by using the communication module 220.

The display 260 may include a panel 262, a hologram device 264, or a projector 266. The panel 262 may be an LCD or an AM-OLED. The panel 262 may be flexible, transparent, or wearable. The panel 262 may be configured by the touch panel 252 and one other module. The hologram device 264 may show a stereoscopic image in the air by using interference of light. The projector 266 may project light on a screen to display an image. The screen may be located inside or outside the electronic device 201. The display 260 may further include a control circuit for controlling the panel 262, the hologram device 264, or the projector 266. The interface 270 may include an HDMI 272, a USB 274, an optical interface 276, or a d-subminiature (D-sub) 278. The interface 270 may be included in the communication interface 170 illustrated in FIG. 1. Additionally or alternatively, the interface 270 may include a mobile high-definition link (MHL) interface, a secure digital (SD) card/multi-media card (MMC), or an IR data association (IrDA) standard interface.

The audio module 280 may bi-directionally convert a sound and an electronic signal. At least some components of the audio module 280 may be included in the input/output interface 150 illustrated in FIG. 1. The audio module 280 may process sound information input or output through, for example, a speaker 282, a receiver 284, an earphone 286, the microphone 288 or the like.

The camera module 291 is a device which can photograph a still image and a video. The camera module 291 may include one or more image sensors (e.g., a front sensor or a back sensor), an image signal processor (ISP) or a flash (e.g., an LED or xenon lamp).

The power managing module 295 may manage power of the electronic device 201. Although not illustrated, the power managing module 295 may include a power management integrated circuit (PMIC), a charger integrated circuit (IC), or a battery gauge.

The PMIC may be mounted to an integrated circuit or an SoC. A charging method may include wired and wireless methods. The charger IC may charge a battery and prevent over voltage or over current from being flowed from a charger. The charger IC may include a charger IC for at least one of the wired charging method and the wireless charging method. The wireless charging method may include a magnetic resonance method, a magnetic induction method and an electromagnetic wave method, and additional circuits for wireless charging, e.g., circuits such as a coil loop, a resonant circuit, a rectifier or the like may be added.

The battery gauge may measure a remaining quantity of the battery 296, or a voltage, a current, or a temperature during the charging. The battery 296 may store or generate electricity and supply power to the electronic device 201 by using the stored or generated electricity. The battery 296 may include a rechargeable battery or a solar battery.

The indicator 297 may show particular statuses of the electronic device 201 or a part (e.g., AP 210) of the hardware, e.g., a booting status, a message status, a charging status and the like. The motor 298 may convert an electrical signal to a mechanical vibration.

Although not illustrated, the electronic device 201 may include a processing unit (e.g., GPU) for supporting a module TV. The processing unit for supporting the mobile TV may process media data according to a standard of digital multimedia broadcasting (DMB), digital video broadcasting (DVB), media flow or the like.

Each of the components of the electronic device 201 may be implemented by one or more components and the name of the corresponding component may vary depending on a type of the electronic device. The electronic device 201 may include at least one of the above described components, a few of the components may be omitted, or an additional component may be further included. Also, some of the components of the electronic device 201 may be combined to form a single entity, and thus may equivalently execute functions of the corresponding components before being combined.

Figure 3:
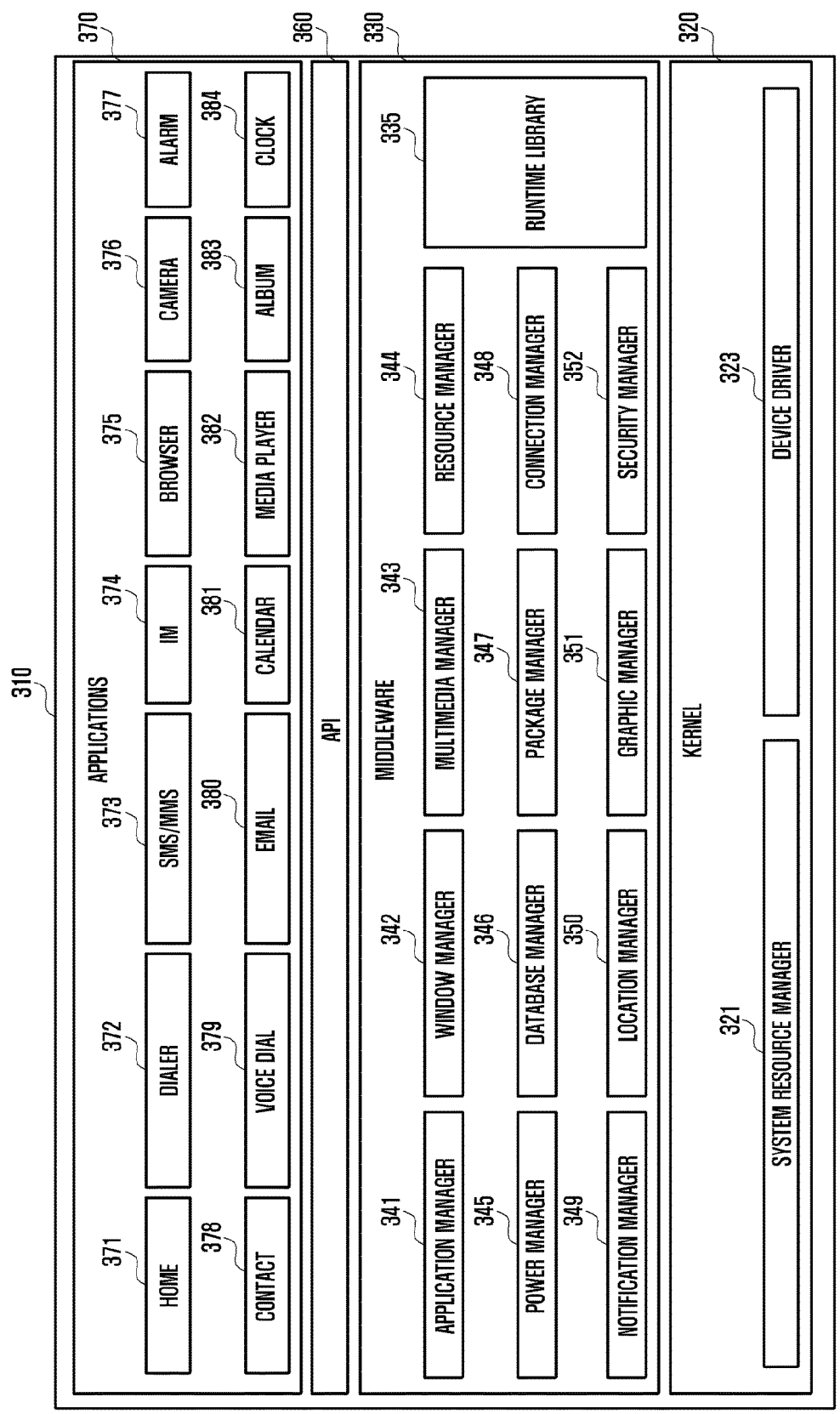
FIG. 3 is a block diagram illustrating a configuration of a program module according to various embodiments of the present disclosure.

FIG. 3 is a block diagram illustrating a programming module 310, according to an embodiment of the present disclosure. The programming module 310 may be included (stored) in the electronic device 101 (e.g., memory 130) illustrated in FIG. 1. At least some of the programming module 310 may be formed of software, firmware, hardware, or a combination of at least two of software, firmware, and hardware. The programming module 310 may be executed in the hardware (e.g., electronic device 201) to include an operating system (OS) controlling resources related to the electronic device 101 or various applications driving on the OS. For example, the OS may be Android™, iOS™, Windows™, Symbian™, Tizen™, Bada™ or the like. Referring to FIG. 3, the programming module 310 may include a kernel 320, a middleware 330, an API 360, or an application 370.

The kernel 320 may include a system resource manager 321 or a device driver 323. The system resource manager 321 may include a process manager, a memory manager, or a file system manager. The system resource manager 321 may perform a system resource control, allocation, or recall. The device driver 323 may include a display driver, a camera driver, a BT driver, a shared memory driver, a USB driver, a keypad driver, a WiFi driver, or an audio driver. Further, the device driver 323 may include an inter-process communication (IPC) driver.

The middleware 330 may include a plurality of modules to provide a function used in common by the applications 370. Further, the middleware 330 may provide a function through the API 360 to allow the application 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module used by a complier to add a new function through a programming language while the application 370 is executed. The runtime library 335 may execute input and output, management of a memory, a function associated with an arithmetic function or the like.

The application manager 341 may manage a life cycle of at least one of the applications 370. The window manager 342 may manage GUI resources used on the screen. The multimedia manager 343 may detect a format used for reproducing various media files and perform an encoding or a decoding of a media file by using a codec suitable for the corresponding format. The resource manager 344 may manage resources such as a source code, a memory, or a storage space of at least one of the applications 370.

The power manager 345 may operate together with a basic input/output system (BIOS) to manage a battery or power and provide power information used for the operation. The database manager 346 may manage generation, search, or change of a database to be used by at least one of the applications 370. The package manager 347 may manage an installation or an update of an application distributed in a form of a package file.

The connection manager 348 may manage a wireless connection such as WiFi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 may provide a general security function used for a system security or a user authentication. When the electronic device 101 has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components may be omitted, replaced with other components having different names but performing similar functions, or other components may be further included.

The API 360 is a set of API programming functions, and may be provided with a different configuration according to an OS. For example, in Android™ or iOS™, a single API set may be provided for each platform. In Tizen™, two or more API sets may be provided.

The applications 370 may include a preloaded application or a third party application.

At least some of the programming module 310 may be implemented by a command stored in a computer-readable storage medium. When the command is executed by one or more APs 210, the one or more processors may perform a function corresponding to the command. The computer-readable storage medium may be, for example, the memory 230. At least some of the programming module 310 may be implemented or executed by, for example, the AP 210. At least some of the programming module 310 may include, for example, a module, a program, a routine, sets of instructions, or a process for performing one or more functions.

Names of components of the programming module 310 may vary depending on a type of operating system. Further, the programming module may include one or more of the aforementioned components, omit some of the components, or further include other additional components.

The applications 370 may include one or more applications that can perform functions, such as home application 371, dialer application 372, SMS/MMS application 373, instant message application (IM) 374, browser application 375, camera application 376, alarm application 377, contacts application 378, voice dial application 379, e-mail application 380, calendar application 381, media player application 382, album application 383, clock application 384, health care (e.g., measure exercise quantity or blood sugar level), or environment information (e.g., atmospheric pressure, humidity, temperature information or the like).

Hereinafter, an illustration of a configuration of an electronic device having a BT or BLE module will be described. It is to be noted that the technology disclosed herein is applicable to other radio communication technologies, especially those having different coverage specifications, though the following description is directed to the Bluetooth technology.

According to various embodiments of the present disclosure, an electronic device (e.g., electronic device 101 of FIG. 1 and electronic device 201 of FIG. 2) may be paired with another Bluetooth-enabled electronic device (e.g., electronic device 102 of FIG. 1) by means of its Bluetooth module. For this purpose, the Bluetooth module of the electronic device 101 may broadcast an inquiry signal for searching for other Bluetooth devices or a paging signal to request for connection or scan for receiving a signal broadcast by other electronic devices. According to various embodiments of the present disclosure, the electronic device 101 may include at least one of a Bluetooth (BT) module and a Bluetooth low energy (BLE) module implemented into a single chip or separate chips, but the present disclosure is not limited thereto.

According to an embodiment of the present disclosure, the electronic device 101 with the BLE communication capability may establish a connection with a neighboring electronic device 102 through a pairing operation. The electronic device 101 may operate as a transmitter for broadcasting a signal (e.g., broadcast mode) and as a receiver for receiving a signal broadcast by the neighboring electronic device 102 (e.g., scan mode) and, although described as one of transmitting or receiving node in the following description, the operation of the electronic device 101 is not limited thereto.

For example, the connection between the electronic devices 101 and 102 may be established in such a way that the electronic device 101 performs BLE scanning to receive an advertisement signal broadcast by the neighboring electronic device 102 and, if it is determined that neighboring electronic device 102 is connectable based on the advertisement signal, transmits a connection request signal to the neighboring electronic device 102. The neighboring electronic device 102 may establish a connection with the electronic device 101 which has transmitted the connection request signal.

Meanwhile, the electronic device 101 may exchange signals through a broadcasting channel or an advertising channel before completing connection establishment with the neighboring electronic device 102.

BLE is a Bluetooth technology that enables low-power data communication at a low-data rate in the 2.4 GHz frequency band. The electronic device 101 may use 40 channels for communication in the 2.4 GHz band. The electronic device 101 may use some of the 40 channels as broadcasting or advertising channels and the remaining channels as data channels.

The broadcasting channels may be used to exchange packets with the neighboring electronic device 102 to transmit an advertising packet or establish a connection to the neighboring electronic device 102. The data channels may be used to communicate data packets after the connection with the neighboring electronic device 102 has been established.

The broadcasting channels may be categorized into two categories: physical channel supporting 1M sym/s symbol rate communication and physical channel supporting 2M sym/s symbol rate communication. The electronic device 101 may support the 1M sym/s symbol rate communication as default and the 2M sym/s symbol rate communication as optional.

Figure 4A:
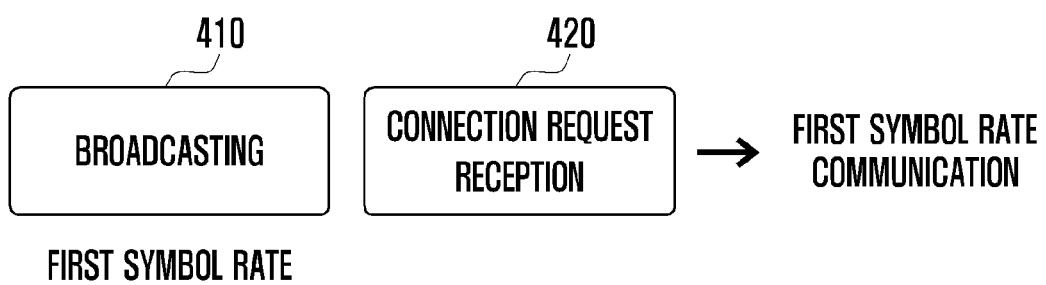
FIGS. 4A and 4B are diagrams illustrating packet sequence per symbol rate type in low-power Bluetooth communication according to various embodiments of the present disclosure.
Figure 4B:
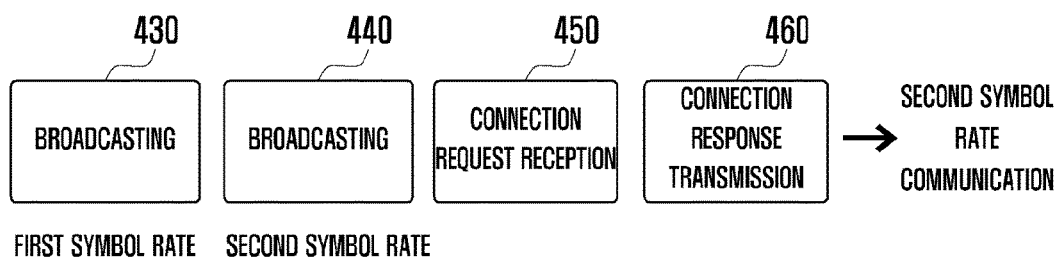

FIGS. 4A and 4B are diagrams illustrating packet sequence per symbol rate type in low-power Bluetooth communication according to various embodiments of the present disclosure.

In reference to FIGS. 4A and 4B, the electronic device 101 (e.g., electronic device 101 of FIG. 1 and electronic device 201 of FIG. 2) may broadcast an advertising packet for advertising its presence at a predetermined interval for BLE communication. For example, the advertising packet is a packet transmitted at the first type symbol rate, e.g., 1M sym/s, as a default symbol rate. The operation of transmitting or receiving an advertising packet is performed when the electronic devices 101 and 102 are in a connectionless state.

As shown in FIG. 4A, the electronic device 101 may broadcast an advertising packet at the symbol rate of 1M sym/s as denoted by reference number 410. If another electronic device 102 is located within the coverage range of the electronic device 101, the neighboring electronic device 102 may transmit a connection request to the electronic device 101 for BLE communication at the first symbol rate (i.e., 1M sym/s) in response to the advertising packet.

The electronic device 101 may receive the connection request transmitted by the neighboring electronic device 102 as denoted by reference number 420. Upon receipt of the connection request, the electronic device 101 may establish a first symbol rate communication link with the neighboring electronic device 102. Here, the electronic devices 101 and 102 may perform a connection provisioning operation for identifying BLE communication profiles and functions.

The electronic devices 101 and 102 may complete establishment of the first symbol rate (i.e., 1M sym/s) communication link through the mutual connection provisioning operation. The electronic devices 101 and 102 may exchange data at the first symbol rate (i.e., 1M sym/s).

In the embodiment of FIG. 4B, the electronic device 101 may broadcast an advertising packet including information on the symbol rate of 1M sym/s or 2M sym/s. If another electronic device 102 receives the advertising packet, the electronic device 102 can assume that the advertising packet is followed by data transmitted at the symbol rate of 1M sym/s or 2M sym/s based on the information included therein. For example, the advertising packet transmitted by the electronic device 101 may include at least one of next advertising packet time information, channel information, and symbol rate type information.

For example, the electronic device 101 may broadcast an advertising packet at the first symbol rate (i.e., 1M sym/s) as denoted by reference number 430. If the electronic device 101 uses an extended broadcasting (advertising extension) packet for BLE communication, the advertising packet transmitted by the electronic device 101 may include the information indicating that the next advertising packet is transmitted at the symbol rate of 2M sym/s.

If another electronic device 102 receives the advertising packet transmitted at the first symbol rate (i.e., 1M sym/s), the electronic device 102 can assume that the advertising packet is followed by an advertising packet transmitted at the second symbol rate (i.e., 2M sym/s) based on the information included therein.

The electronic device 101 may broadcast the advertising packet at the second symbol rate (i.e., 2M sym/s) as denoted by reference number 440. Upon receipt of the advertising packet as denoted by reference number 440, the neighboring electronic device 102 may transmit a connection request to the electronic device 101 for communication at the second symbol rate (e.g., 2M sym/s).

The electronic device 101 may receive the connection request transmitted by the neighboring electronic device 102 as denoted by reference number 450. In response to the connection request, the electronic device 101 may transmit a connection response for confirming establishment of the second symbol rate communication link as denoted by reference number 460. After transmitting the connection response, the electronic device 101 may perform a second symbol rate communication provisioning operation to establish the second symbol rate communication link with the neighboring electronic device 102.

Hereinafter, a description is made of a coverage compensation method for compensating for coverage mismatch caused by a change of symbol rate type of the BLE communication according to various embodiments of the present disclosure.

Figure 5:
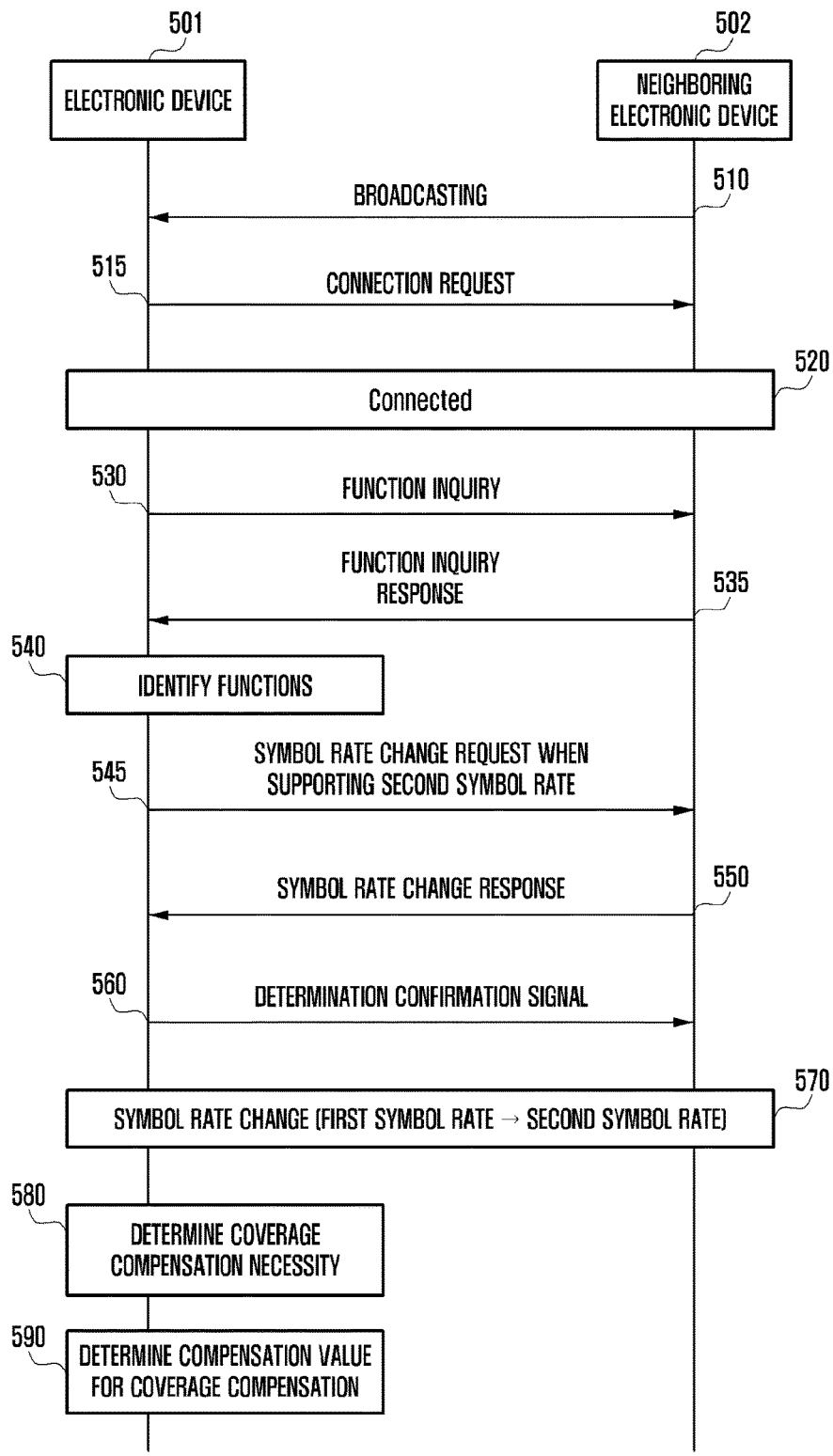
FIG. 5 is a signal flow diagram illustrating signal flows between two electronic devices in a BLE communication coverage compensation method according to various embodiments of the present disclosure.

FIG. 5 is a signal flow diagram illustrating signal flows between two electronic devices in a BLE communication coverage compensation method according to various embodiments of the present disclosure.

In the embodiment of FIG. 5, an electronic device 501 (e.g., electronic device 101 of FIG. 1 and electronic device 201 of FIG. 2) may change the symbol rate in the course of communication with a neighboring electronic device 502 (e.g., electronic device 102 of FIG. 1) and, in this case, compensate its coverage range as the data propagation distance.

The neighboring electronic device 502 may broadcast a BLE communication request signal periodically at step 510. The neighboring electronic device 502 may broadcast an advertising packet (e.g., connectable advertising packet) for advertising its presence at a predetermined interval.

If the advertising packet transmitted by the neighboring electronic device 502 is received by the electronic device 501, the electronic device 501 may transmit a connection request to the neighboring electronic device 502 at step 515.

The electronic device 501 may establish a connection with the neighboring electronic device 502 at step 520. For example, the connection between the two electronic devices 501 and 502 is established when the neighboring electronic device 502 receives the connection request transmitted by the electronic device 501.

According to an embodiment of the present disclosure, both the electronic devices 501 and 502 may use a first type symbol rate (i.e., 1M sym/s) broadcasting channel for Bluetooth communication. The neighboring electronic device 502 may use the first type symbol rate (i.e., 1M sym/s) broadcasting channel for advertisement, and the electronic device 501 may also use the first type symbol rate (i.e., 1M sym/s) broadcasting channel for a connection request to the neighboring electronic device 502. Upon receipt of the connection request from the electronic device 501, the neighboring electronic device 502 may transition to a connected state for data communication with the electronic device 501.

The electronic device 501 may inquire to the neighboring electronic device 502 about the functions associated with BLE communication at step 530. For example, the electronic device 501 may inquire about all supporting profiles related to the BLE communication, e.g., whether the neighboring electronic device 502 supports arbitrary address change, data packet length extension, 2M sym/s symbol rate, and packet extension, and whether the neighboring electronic device is in the activated state for communication.

At step 535, the neighboring electronic device 502 may transmit the information on the functions it supports for BLE communication based on its specification in response to the function inquiry.

The electronic device 501 may identify, at step 540, the functions supported by the neighboring electronic device 502 based on at least part of the received information. For example, the electronic device 501 may determine whether the neighboring electronic device 502 supports the second symbol rate (i.e., 2M sym/s) communication based on at least part of the inquiry result from the neighboring electronic device 502.

At step 545, the electronic device 501 may transmit a symbol rate change request signal to the neighboring electronic device 502 to determine whether the neighboring electronic device 502 can change its symbol rate to the symbol rate desired by the electronic device 501. For example, the symbol rate change request signal may include the information indicative of change from the first to second symbol rate or on the condition for changing from the first to second symbol rate.

At step 550, the neighboring electronic device 502 may transmit a symbol rate change response signal including information on the symbol rates it supports. For example, the symbol rate change response signal transmitted by the neighboring electronic device 502 may include the symbol rates that are determined as supportable based on its status information (e.g., residual battery power, currently running application status, and user settings).

For example, if the electronic device 501 transmits the information on the condition for changing the symbol rate, the neighboring electronic device 502 may transmit the symbol rate change response signal including the information on a change value (e.g., transmit power value and receive power value) determined based on the condition information for changing the symbol rate.

At step 560, the electronic device 501 may transmit a confirmation signal to the neighboring electronic device 502 to confirm the symbol rate change to the second symbol rate (i.e., 2M sym/s).

According to an embodiment of the present disclosure, if the change value for symbol rate change to the second symbol rate (i.e., 2M sym/s) is received from the neighboring electronic device 502, the electronic device 501 may control such that the symbol rate is changed to the second symbol rate (i.e., 2M sym/s) based on the change value.

According to an embodiment of the present disclosure, the electronic device 501 may transmit to the neighboring electronic device 502 the symbol rate change request signal to request for symbol rate change to the second symbol rate based on the functions supported by the neighboring electronic device 502, as identified at step 540.

Although steps 540 and 560 have been described under the assumption that the electronic device 501 requests to the neighboring electronic device 502 for symbol rate change, the present disclosure is not limited thereto, and it may include the case where the neighboring electronic device 502 requests to the electronic device 501 for symbol rate change. In embodiments where the neighboring electronic device 502 requests for symbol rate change, the neighboring electronic device 502 may become the initiator of the process of steps 530 to 560, and some of steps 530 to 560 may be partly omitted. For example, if it is necessary to change the symbol rate, the neighboring electronic device 502 may transmit to the electronic device 502 a signal to request for changing to the second symbol rate (i.e., 2Msym/s) and, in response to the request signal, the electronic device 501 may transmit to the neighboring electronic device 502 a response signal indicative of accepting the request, whereby the symbol rate change being confirmed between the two electronic device 501 and 502.

At step 570, the electronic devices 501 and 502 may change the symbol rate. For example, the electronic devices 501 and 502 may switch from the first type symbol rate (i.e., 1M sym/s) communication to the second type symbol rate (2M sym/s) communication.

At step 580, the electronic device 501 may determine whether coverage compensation is necessary for the symbol rate change. For example, in the case of changing to the second symbol rate (i.e., 2M sym/s), the electronic device 501 may determine the coverage compensation necessity when detecting at least one of the following events: requesting symbol rate from the first symbol rate (i.e., 1M sym/s) to the second symbol rate (i.e., 2M sym/s), detecting that the second symbol rate BLE communication has a higher priority, detecting that the retransmission rate in the first type symbol rate (i.e., 1M sym/s) communication is greater than a predetermined value, and detecting that the received signal strength measured in the first type symbol rate (i.e., 1M sym/s) communication is less than a predetermined value.

At step 590, the electronic device 501 may determine a compensation value for use in coverage compensation for the symbol rate change. For example, the electronic device 501 may determine a difference of sensitivity between the first type symbol rate (i.e., 1M sym/s) and the second type symbol rate (i.e., 2M sym/s) as the compensation value and add the compensation value to the transmit (TX) power to determine a TX power value. The electronic device 501 may control the TX power for Bluetooth communication using the compensation value.

Steps 580 and 590 may be performed before the symbol rate change, i.e., step 570, or after the symbol rate change as depicted in the drawing.

According to various embodiments of the present disclosure, the electronic device 501 may perform the coverage compensation necessity determination operation of step 580 repetitively or in real time after the symbol rate change.

According to an embodiment of the present disclosure, the electronic device 502 may perform the coverage compensation necessity determination operation after the symbol rate change in the same manner as the electronic device 501.

Figure 6:
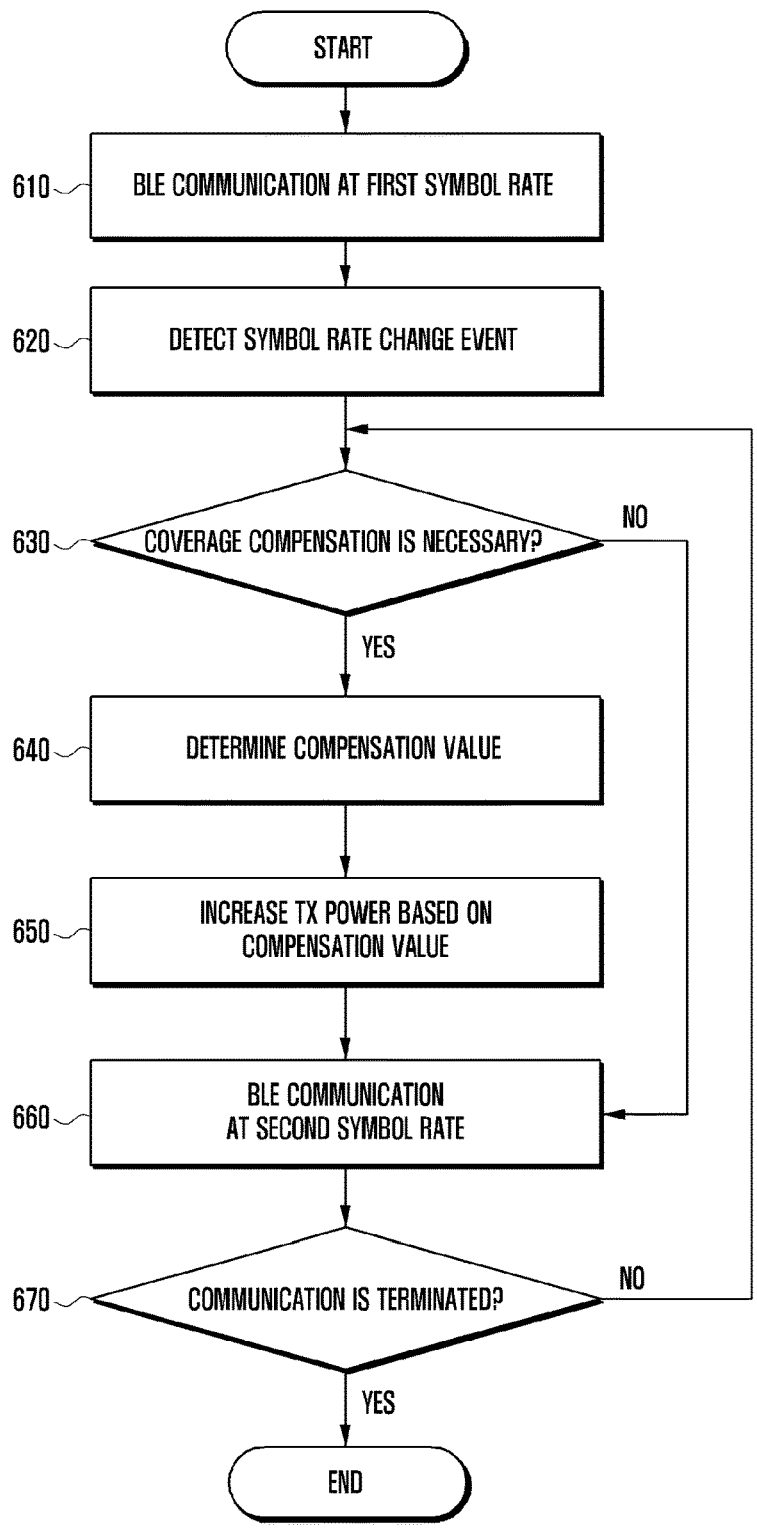
FIG. 6 is a flowchart illustrating a BLE communication coverage compensation method of an electronic device according to various embodiments of the present disclosure.

FIG. 6 is a flowchart illustrating a BLE communication coverage compensation method of an electronic device according to various embodiments of the present disclosure.

In reference to FIG. 6, an electronic device (e.g., electronic device 101 of FIG. 1 and electronic device 201 of FIG. 2) may perform BLE communication with a neighboring electronic device (e.g., electronic device 102 of FIG. 1) at a first symbol rate (e.g., 1M sym/s) at step 610.

According to an embodiment of the present disclosure, at step 610, the electronic device 101 may exchange BLE data packets with the neighboring electronic device 102 through the BLE communication. Although the description is directed to the operation of the electronic device 101 as the main operation entity, the coverage compensation necessity detection and compensation value determination operations may be performed by a processor (e.g., processor 120 of FIG. 1 and AP 210 of FIG. 2) or a BT module (e.g., BT module 225 of FIG. 2) independently or cooperatively, and the communication channel establishment with the neighboring electronic device 102 and data communication may be performed by the BT module 225.

At step 620, the electronic device 101 may detect a symbol rate change event. According to an embodiment of the present disclosure, the symbol rate change event occurs when the electronic device 101 reduces the electric current for transmission or increases a data rate to avoid interference from another radio communication device operating in the 2.4 GHz band on the condition that the electronic device 101 supports the 2M sym/s transmission. Examples of the symbol rate change event may include an event requesting for transmitting or receiving data greater than a predetermined size, advertisement data transmission or reception event, user input requesting for change to the second symbol rate, data rate increase request event, and additional data exchange request event after receipt of advertisement data.

At step 630, the electronic device 101 may determine whether coverage compensation is necessary for symbol rate change upon detection of the symbol rate change event. For example, the electronic device 101 may determine the coverage compensation necessity when detecting at least one of the following events: detecting an event requesting symbol rate from the first symbol rate (i.e., 1M sym/s) to the second symbol rate (i.e., 2M sym/s), detecting that the second symbol rate BLE communication has a higher priority, detecting that the retransmission rate in the first type symbol rate (i.e., 1M sym/s) communication is greater than a predetermined value, and detecting that the received signal strength measured in the first type symbol rate (i.e., 1M sym/s) communication is less than a predetermined value.

If it is determined at step 630 that coverage compensation is necessary, the electronic device 101 may determine at step 640 a compensation value for coverage compensation. The electronic device 101 may determine the sensitivity difference between the first type symbol rate of 1M sym/s and the second type symbol rate of 2M sym/s as the compensation value and add or subtract (or remove) the compensation value to and from the TX power to determine a TX power value. For example, the electronic device 101 may add the compensation value of about 2 dBm for the case of change from 1M sym/s to 2M sym/s and subtract the compensation value of about 2 dBm for the case of change from 2M sym/s to 1M sym/s.

At step 650, the electronic device 101 may determine to increase the TX power value based on the compensation value. The electronic device 101 may control the TX power for Bluetooth communication based on the compensation value.

At step 660, the electronic device 101 may perform BLE communication at the second symbol rate (i.e., 2M sym/s) with the increase of TX power value.

If it is determined at step 630 that coverage compensation is not necessary, the procedure jumps to step 660, at which step the electronic device 101 performs BLE communication at the second symbol rate.

At step 670, the electronic device 101 may determine whether the communication is terminated. If it is determined that the communication is terminated, the electronic device 101 ends the process; if it is determined that the communication is not terminated, the procedure returns to step 630, at which step the electronic device 101 determines whether coverage compensation is necessary for the subsequent steps (steps 630 to 670) periodically or in real time.

Figure 7:
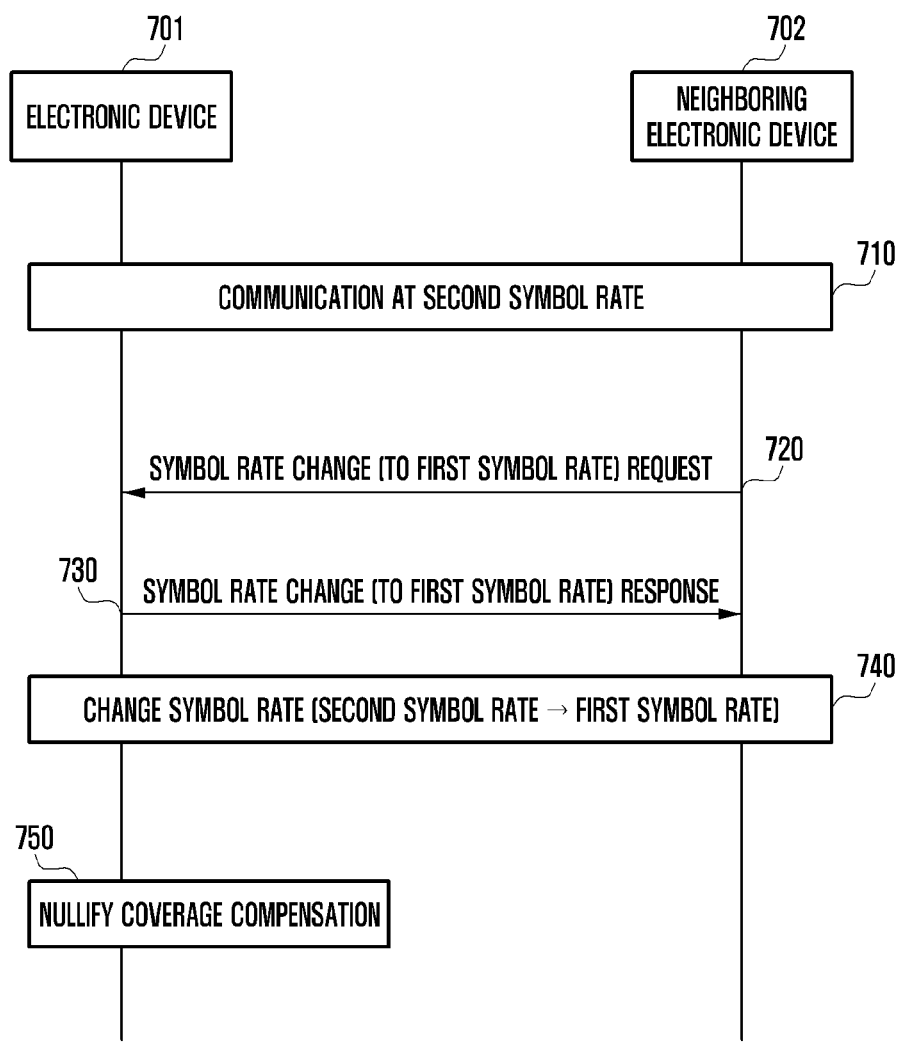
FIG. 7 is a signal flow diagram illustrating signal flows between two electronic devices in a BLE communication coverage compensation method according to various embodiments of the present disclosure.

FIG. 7 is a signal flow diagram illustrating signal flows between two electronic devices in a BLE communication coverage compensation method according to various embodiments of the present disclosure.

In reference to FIG. 7, if symbol rate change is used in the state where the coverage range has been compensated in the course of BLE communication with a neighboring electronic device 702 (e.g., electronic device 102 of FIG. 1), the electronic device 701 (e.g., electronic device 101 of FIG. 1 and electronic device 201 of FIG. 2) may reduce the compensated coverage range.

At step 710, the electronic devices 701 and 702 may be connected for a second symbol rate (2M sym/s) in BLE communication.

At step 720, the neighboring electronic device 702 may transmit to the electronic device 701 a symbol rate change request signal for changing from the second symbol rate to a first symbol rate.

For example, the neighboring electronic device 702 may request for symbol rate change to the first symbol rate when detecting at least one of the following events: detecting a request for transmitting or receiving data less than a predetermined size, detecting location change of the electronic device 701 moving toward an area where coverage range of the first symbol rate detecting a user input requesting for symbol rate change from the second to first symbol rate, detecting execution of a predetermined application requiring communication at the first symbol rate, and detecting that the number of retransmissions has become smaller than a predetermined value or the reception sensitivity is greater than a predetermined value after changing the TX power value for coverage compensation.

At step 730, the electronic device 701 may transmit to the neighboring electronic device 702 a symbol rate change response signal for accepting the symbol rate change to the first symbol rate. Although the description is directed to the case where the neighboring electronic device 702 requests to the electronic device 701 for symbol rate change at step 720, the present disclosure is not limited thereto, and it may include the embodiment where the electronic device 701 transmits the symbol rate change request signal to the neighboring electronic device 702 and then the neighboring electronic device 702 transmits the symbol rate change response signal to the electronic device 701.

At step 740, the electronic devices 701 and 702 may perform symbol rate change from the second symbol rate (i.e., 2M sym/s) to the first symbol rate (i.e., 1M sym/s).

At step 750, the electronic device 701 may determine the compensation value for reducing the coverage range that has already been compensated for the data rate change to the second symbol rate and nullify the applied coverage compensation based on the compensation value. Although FIG. 7 depicts that the electronic device 701 nullifies the coverage compensation, it may also be possible for the neighboring electronic device 702 to perform the nullification operation of step 750 in the state that the coverage range has been compensated according to a symbol rate change.

Figure 8:
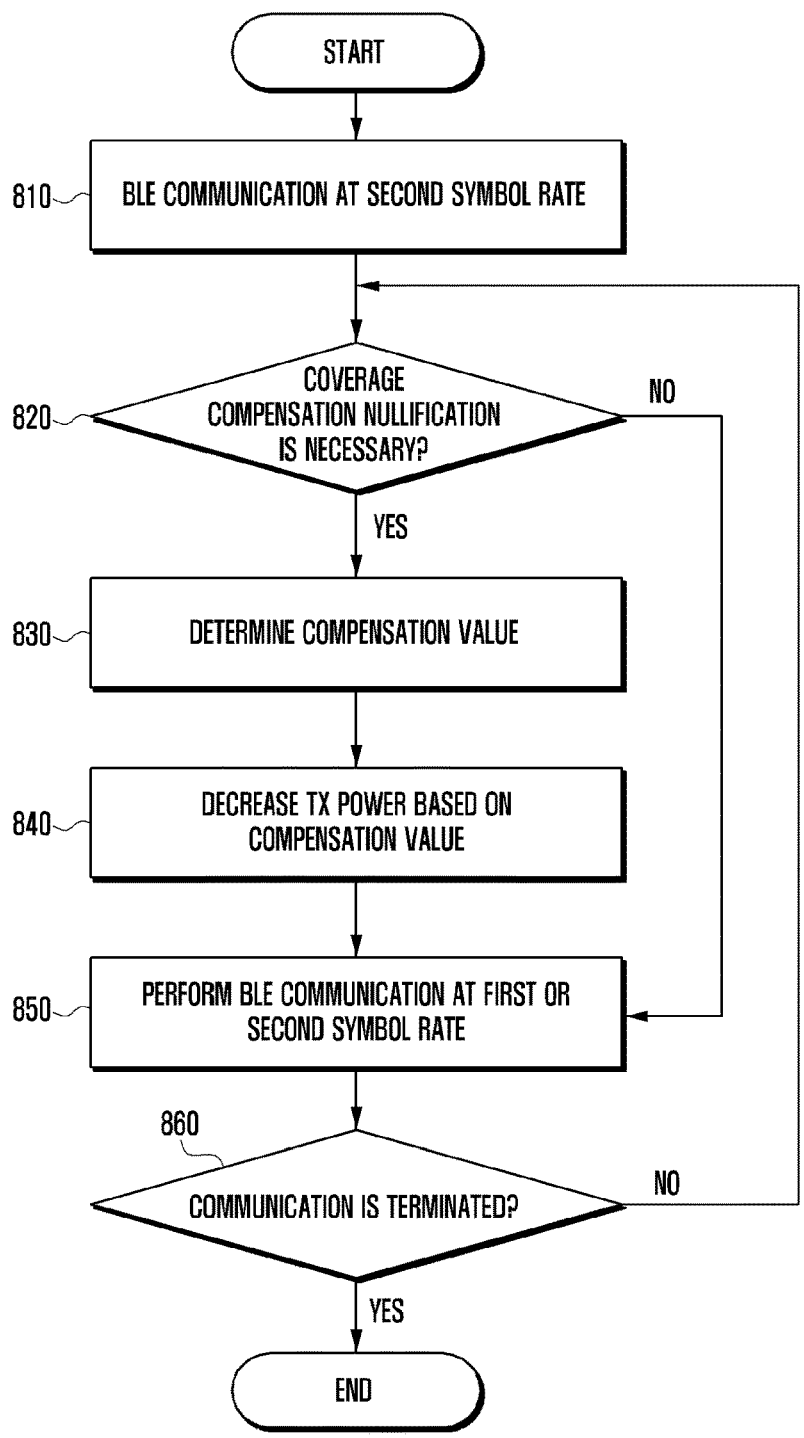
FIG. 8 is a flowchart illustrating a Bluetooth communication coverage compensation method of an electronic device according to various embodiments of the present disclosure.

FIG. 8 is a flowchart illustrating a Bluetooth communication coverage compensation method of an electronic device according to various embodiments of the present disclosure.

In reference to FIG. 8, the electronic device (e.g., electronic device 101 of FIG. 1 and electronic device 201 of FIG. 2) may perform BLE communication with a neighboring electronic device (e.g., electronic device 102 of FIG. 1) at a second symbol rate (e.g., 2M sym/s) at step 810. For example, the electronic device 101 may exchange BLE data packets with the neighboring electronic device 102 through the BLE communication. Although the description is directed to the operation of the electronic device 101 as the main operation entity for convenience of explanation, the coverage compensation necessity detection and compensation value determination operations may be performed by a processor (e.g., processor 120 of FIG. 1 and AP 210 of FIG. 2) or a BT module (e.g., BT module 225 of FIG. 2) independently or cooperatively, and the communication channel establishment with the neighboring electronic device and data communication may be performed by the BT module 225. According to an embodiment of the present disclosure, the electronic device 101 may have increased its TX power value configured for the first symbol rate (e.g., 1M sym/s) communication by applying the compensation value determined for coverage compensation upon detection of a symbol rate change event in the course of the BLE connection or data transmission operation.

In the case that the TX power value has been increased for the second symbol rate BLE communication or coverage compensation, the electronic device 101 may determine at step 820 whether coverage compensation nullification is necessary. For example, the electronic device 101 may determine the coverage compensation nullification necessity when detecting at least one of the following events: detecting a request for transmitting or receiving data less than a predetermined size, detecting location change of the electronic device 101 moving toward an area where coverage reduction to the first symbol rate coverage range is used, detecting a user input requesting for symbol rate change from the second to first symbol rate, detecting execution of a predetermined application requiring communication at the first symbol rate, and detecting that the number of retransmissions becomes smaller than a predetermined value or the reception sensitivity is greater than a predetermined value after changing the TX power value for coverage compensation.

If it is determined at step 820 that coverage compensation nullification is necessary, the electronic device 101 may determine at step 830 the compensation value for compensation nullification. For example, the electronic device 101 may check the compensation value applied in switching from the first symbol rate (i.e., 1M sym/s) communication to the second symbol rate (i.e., 2M sym/s) communication for nullifying the applied compensation or determine the compensation value based on the reduced amount of the coverage range or the sensitivity difference between the first symbol rate (i.e., 1M sym/s) and the second symbol rate (i.e., 2M sym/s).

If it is determined at step 820 that coverage compensation nullification is not necessary, the procedure jumps to step 850, at which step the electronic device 101 may control the radio communication circuit for the first or second symbol rate communication and then determine repetitively at step 860 whether the communication is terminated.

At step 840, the electronic device 101 may decrease the TX power value based on the compensation value. For example, the electronic device 101 may decrease the TX power value by subtracting the compensation value determined at step 830 from the preset TX power.

At step 850, the electronic device 101 may control the radio communication circuit for BLE communication with the neighboring electronic device 102 at the first symbol rate or the second symbol rate by nullifying the compensation value.

At step 860, the electronic device 101 may determine whether the communication is terminated.

If it is determined at step 860 that the communication is terminated, the procedure ends; if it is determined at step 860 that the communication is not terminated, the procedure returns to step 820, at which step the electronic device 101 determines repetitively whether coverage compensation nullification is necessary for the subsequent steps (steps 820 to 860). For example, if the compensation value applied for coverage compensation is not nullified completely through the compensation nullification operation, the electronic device 101 may determine to perform the coverage compensation nullification operation again.

Figure 9:
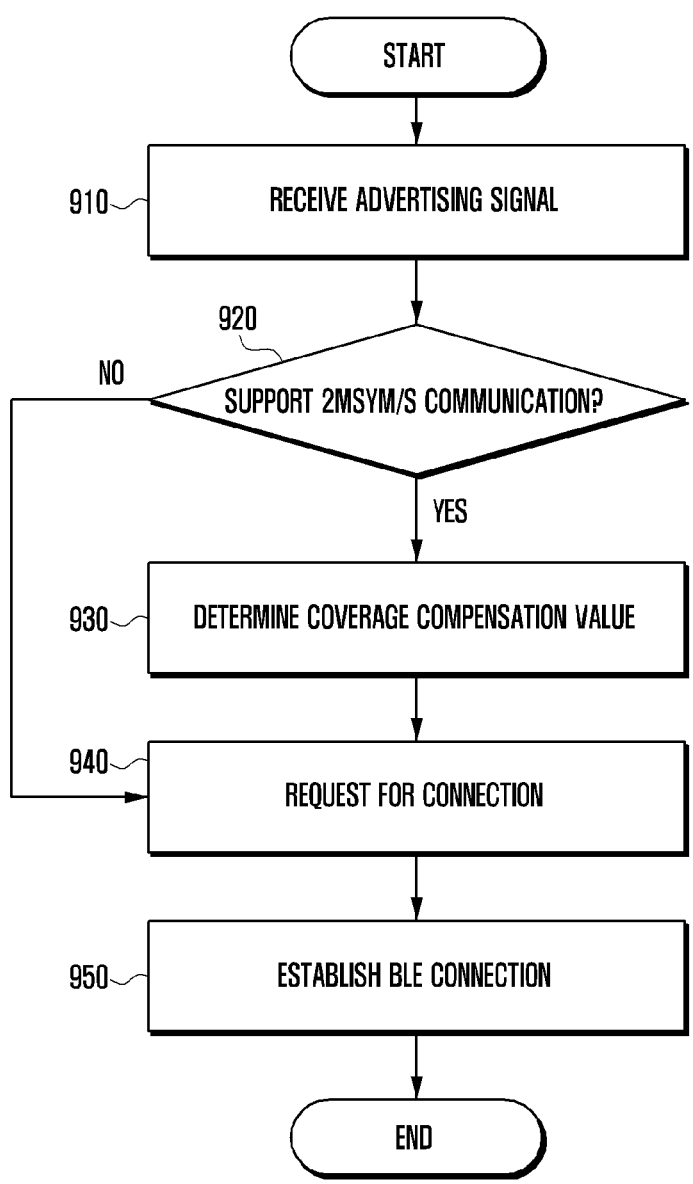
FIG. 9 is a flowchart illustrating a BLE communication compensation method of an electronic device according to various embodiments of the present disclosure.

FIG. 9 is a flowchart illustrating a BLE communication compensation method of an electronic device according to various embodiments of the present disclosure.

In reference to FIG. 9, an electronic device (e.g., electronic device 101 of FIG. 1 and electronic device 201 of FIG. 2) may receive an advertising packet broadcast by a neighboring electronic device (e.g., electronic device 102 of FIG. 1) at step 910. For example, the neighboring electronic device 102 may broadcast the advertising packet including a 1M sym/s or 2M sym/s communication request information.

At step 920, the electronic device 101 may determine whether the neighboring electronic device 102 supports a 2M sym/s communication based on the information included in the advertising packet. For example, the electronic device 101 may predict whether the next packet is transmitted at the symbol rate of 1M sym/s or 2M sym/s based on at least part of the information (e.g., next advertising packet time information, channel information, and symbol rate information) included in the advertising packet.

If it is determined at step 920 that the neighboring electronic device 102 supports the 2M sym/s communication, the electronic device 101 may determine at step 930 a coverage compensation value for the 2M sym/s communication.

For example, the electronic device 101 may determine the sensitivity difference between the two symbol rates of 1M sym/s and 2M sym/s as the compensation value and add the compensation value to the TX power to determine the TX power value. The electronic device 101 may control the TX power for Bluetooth communication based on the compensation value.

If it is determined that the neighboring electronic device 102 supports the 2M sym/s communication, at step 940 the electronic device 101 may request to the neighboring electronic device 102 for the 2M sym/s communication. For example, the electronic device 101 may request to the neighboring electronic device 102 for 2M sym/s BLE communication.

If it is determined at step 920 that the neighboring electronic device 102 does not support the 2M sym/s communication, the electronic device 101 may request to the neighboring electronic device 102 for 1M sym/s communication at step 940.

According to various embodiments of the present disclosure, step 930 may be performed, but it is not limited to following step 940.

At step 950, the electronic device 101 may establish a BLE connection with the neighboring electronic device 102 for 1M sym/s communication or 2M sym/s communication.

Figure 10:
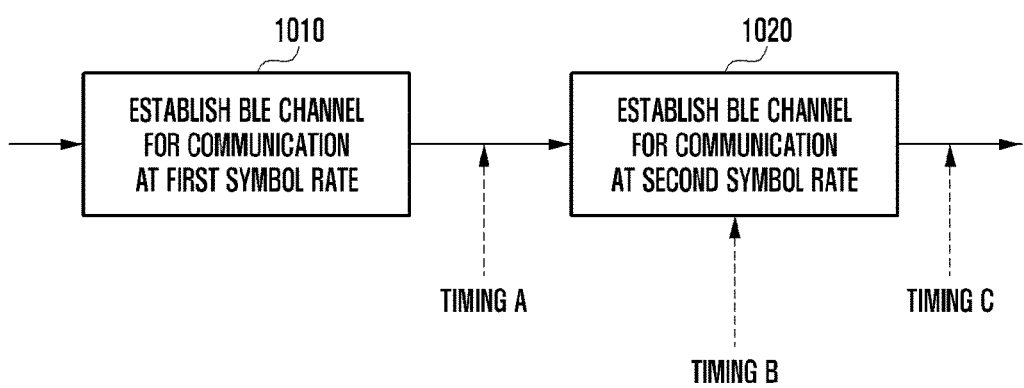
FIG. 10 is a diagram illustrating coverage compensation-related operation timings of an electronic device according to various embodiments of the present disclosure.

FIG. 10 is a diagram illustrating coverage compensation-related operation timings of an electronic device according to various embodiments of the present disclosure.

In reference to FIG. 10, the electronic device (e.g., electronic device 101 of FIG. 1 and electronic device 201 of FIG. 2) may detect a symbol rate change event or a compensation nullification event, determine a compensation value for coverage range extension or reduction, and change a data transmission power (e.g., increase/decreased TX power value) based on the compensation value. For example, the timing for changing data transmission power may be, but is not limited to, at least one of the following: during BT data exchange, before symbol rate change, and after symbol rate change.

For example, the electronic device 101 may establish a BLE channel with a neighboring electronic device (e.g., electronic device 102 of FIG. 1) for BLE data packet communication at a first symbol rate as denoted by reference number 1010. According to an embodiment of the present disclosure, if the symbol rate change event is detected, the electronic device 101 may detect a necessity of coverage compensation or coverage compensation nullification at timing A before modifying the BLE channel for the second symbol rate communication as denoted by reference number 1020, determine the compensation value, and adjust the TX power based on the compensation value.

According to an embodiment of the present disclosure, after establishing the BLE channel for the first symbol rate BLE communication as denoted by reference number 1010, the electronic device 101 may perform the coverage compensation or coverage compensation nullification operation at timing B for data packet communication at the second symbol rate as denoted by reference number 1020. According to an embodiment of the present disclosure, after establishing the BLE channel for the second symbol rate communication, the electronic device 101 may perform the coverage compensation or coverage compensation nullification operation at timing C after establishing the BLE channel for the second symbol rate communication.

According to various embodiments of the present disclosure, the electronic device 101 may make a data transmission power adjustment determination at predetermined occasions independently or sequentially and, if it is determined that compensation or compensation nullification is not necessary at each timing, determine whether compensation is necessary at the next timing to re-determine the compensation value and compensate the coverage range or nullify coverage compensation based on the re-determined compensation value.

Figure 11:
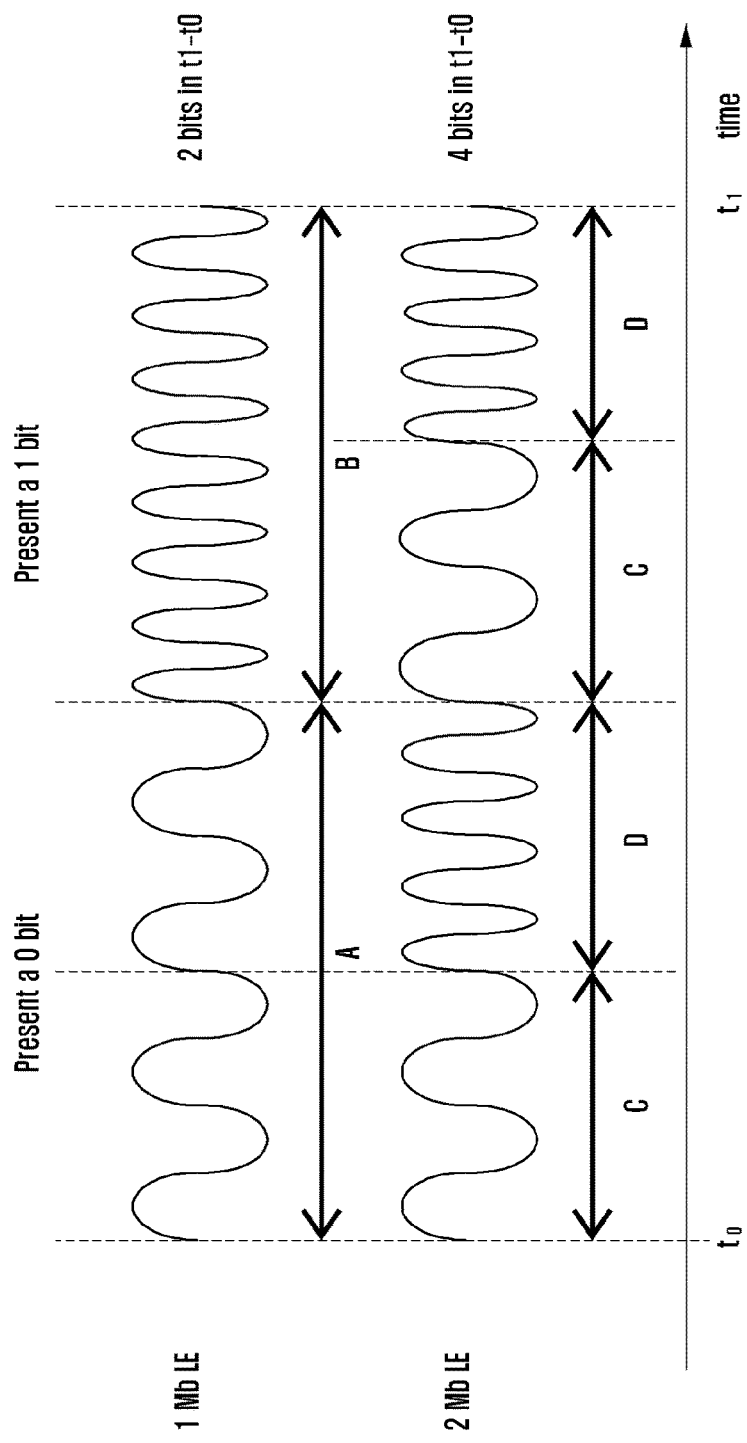
FIG. 11 is a graph illustrating waveforms of signals transmitted by an electronic device at different symbol rates with different coverage ranges according to various embodiments of the present disclosure.

FIG. 11 is a graph illustrating waveforms of signals transmitted by an electronic device at different symbol rates with different coverage ranges according to various embodiments of the present disclosure.

In reference to FIG. 11, an electronic device (e.g., electronic device 101 of FIG. 1 and electronic device 201 of FIG. 2) may detect change of the coverage range according to symbol rate change and extend or reduce the coverage range based on the difference between the coverage ranges at the respective symbol rates to provide the BT communication service seamlessly even when the symbol rate is changed. Although the description is directed to the operation of the electronic device 101 as the main operation entity for convenience of explanation, the coverage compensation necessity detection and compensation value determination operations may be performed by a processor (e.g., processor 120 of FIG. 1 and AP 210 of FIG. 2) or a BT module (e.g., BT module 225 of FIG. 2) independently or cooperatively.

The BLE communication may be performed at one of two symbol rates: 1M sym/s and 2M sym/s. If a signal modulated with Gaussian frequency shift keying (GFSK) is transmitted at the one of both the symbol rates, one symbol represents one bit. If the signal is transmitted at 1M sym/s, this means that 1 Megabits of data are transmitted per 1 second; if the signal is transmitted at 2M sym/s, this means that 2 Megabits of data are transmitted per second. A symbol may have one of 0-bit waveform and 1-bit waveform.

As shown in FIG. 11, in the case of using the symbol rate of 1M sym/s, the electronic device 101 as a receiver may recognize 0-bit data at the time point when the 0-bit waveform reception is completed in the first duration (A) and then 1-bit data at the time point when the 1-bit waveform reception is completed in the second duration (B). Accordingly, 2 bits of data can be transmitted during the period between t1 and t0 in the 1M sym/s communication. Meanwhile, in the case of using the symbol rate of 2M sym/s, the electronic device 101 as a receiver may recognize 0-bit data at the time point when the 0-bit waveform reception is completed in the third duration (C) and then 1-bit data at the time point when the 1-bit waveform reception is completed in the fourth duration (D). Accordingly, 4 bits of data can be transmitted during the period between t1 and t0 in the 2M sym/s communication, which means that the data rate corresponding to the 2M sym/s is higher than the data rate corresponding to the 1M sym/s. In the case where the length of the data waveform used for recognizing the data transmitted at 2M sym/s is shortened, if the data propagation distance grows, the recognition rate decreases; thus, the coverage range (or radius) decreases in comparison with the case of transmitting the data at 1M sym/s.

Figure 12:
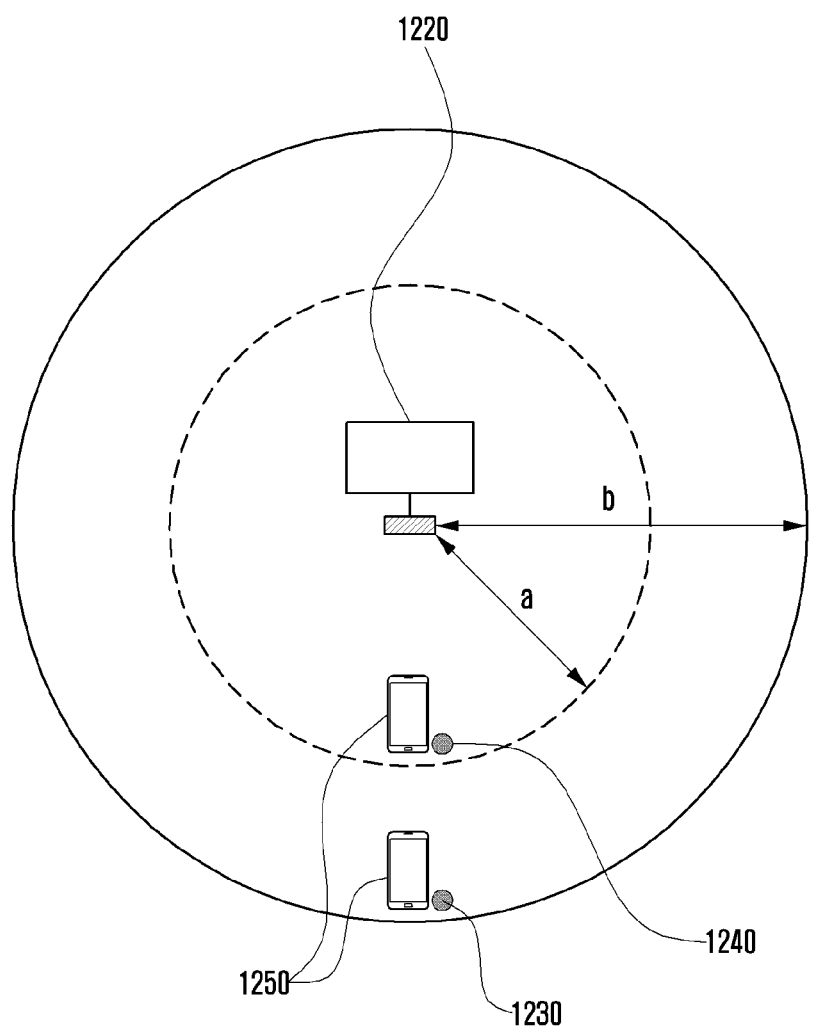
FIG. 12 is a schematic diagram illustrating coverage ranges for two symbol rates according to various embodiments of the present disclosure.

FIG. 12 is a schematic diagram illustrating coverage ranges for two symbol rates according to various embodiments of the present disclosure.

In reference to FIG. 12, two Bluetooth-enabled electronic devices 1220 and 1250 may be located at certain points. The electronic device 1220 may have a 1M sym/s communication coverage with a radius of b and a 2M sym/s communication coverage with a radius of a. In the following description, it is assumed that the electronic device 1220 is fixed and the other electronic device 1250 is mobile for convenience of explanation.

According to an embodiment of the present disclosure, if the mobile electronic device 1250 is located within the 2M sym/s communication coverage (e.g., radius b) of the fixed electronic device 1220, it may receive the information broadcast by the electronic device 1220. For example, the fixed electronic device 1220 may broadcast BLE information at the symbol rate of 1M sym/s. The mobile electronic device 1250 may receive the BLE information broadcast by the fixed electronic device 1220 and present the BLE information to its user. The mobile electronic device 1250 may request to the fixed electronic device 1220 for data packet exchange to acquire supplementary information (e.g., coupon and payment information) according to a user input. The supplementary information may exceed an agreed data limit and thus require 2M sym/s Bluetooth communication rather than the 1M sym/s BLE communication.

In the case that the two electronic devices 1220 and 1250 are communicating through a 2M sym/s Bluetooth communication link, in order for the mobile electronic device 1250 to download the supplementary information in response to a user's download command input, the mobile electronic device 1250 has to move to a certain position 1240 within the 2M sym/s coverage of the fixed electronic device 1220. If the mobile electronic device 1250 is located at a certain position 1230 out of the 2M sym/s communication coverage, it may not receive BLE communication data from the fixed electronic device 1220. If the mobile electronic device 1250 moves from a position within the radius "a" to a position within the radius "b," this may cause symbol rate change, which may result in communication breakdown between the electronic devices 1220 and 1250. According to an embodiment of the present disclosure, if the mobile electronic device 1250 determines to receive data at 2M sym/s based on the BLE information transmitted by the fixed electronic device 1220, the mobile electronic device 1250 may detect fulfillment of a condition for symbol rate change.

According to various embodiments of the present disclosure, if a symbol rate change condition that triggers coverage range reduction from radius b to radius a is fulfilled, the mobile electronic device 1250 (e.g., electronic device 101 of FIG. 1 and electronic device 201 of FIG. 2) may determine a compensation value for extending the coverage range before or after the 2M sym/s communication channel establishment or during the 1M sym/s data packet transmission and increase the TX power based on the compensation value to protect against BLE communication breakdown caused by symbol rate change.

According to an embodiment of the present disclosure, it may be helpful for the mobile electronic device 1250 to perform a high-speed data transmission to the fixed electronic device 1220. If the fixed electronic device 1220 accepts the request from the mobile electronic device 1250 for high-speed data transmission at a position out of the 2M sym/s communication coverage, this may cause a data loss problem; thus, the high-speed data transmission request is restricted within the radius a.

According to an embodiment of the present disclosure, in order for the mobile electronic device 1250 to receive supplementary information (e.g., large data) or data at a high data rate or to switch to the 2M sym/s communication at a position out of the radius a, it is helpful to perform coverage compensation (e.g., TX power increase) to extend the 2M sym/s communication coverage from radius a to radius b, whereby the mobile electronic device 1250 located at the position 1230 may perform the high-speed data communication with the fixed electronic device 1220.

According to an embodiment, if there is a symbol rate change from a first symbol rate to a second symbol rate, a compensation value may be determined based on a coverage range at the second symbol rate. More specifically, the compensation value may be determined based on the coverage range at the second symbol rate with respect to the coverage range to the first symbol rate. For example, if the coverage range is expected to be reduced without adjusting the TX power, then the compensation value may be determined to increase the TX power (coverage compensation); or alternatively, if the coverage range is expected to be increased without adjusting the TX power, then the compensation value may be determined to reduce the TX power (compensation nullification).

Figure 13:
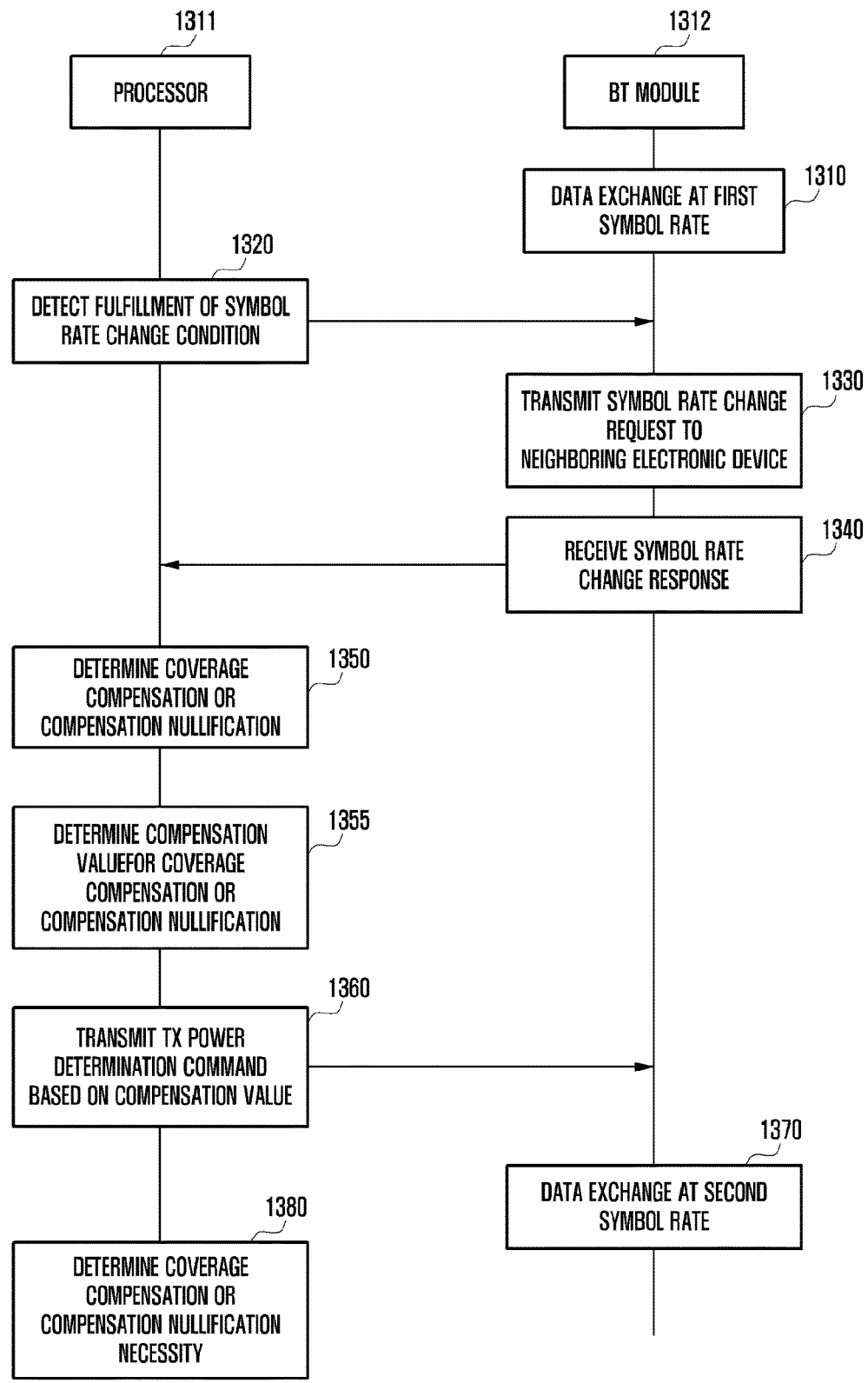
FIG. 13 is a signal flow diagram illustrating signals flows between a processor and a Bluetooth module in a BLE communication coverage compensation method of an electronic device according to various embodiments of the present disclosure.

FIG. 13 is a signal flow diagram illustrating signals flows between a processor and a Bluetooth module in a BLE communication coverage compensation method of an electronic device according to various embodiments of the present disclosure.

In reference to FIG. 13, the electronic device (e.g., electronic device 101 of FIG. 1 and electronic device 201 of FIG. 2) may perform BLE communication with a neighboring electronic device (e.g., electronic device 102 of FIG. 1) at a first symbol rate by means of a BT module 1312 at step 1310.

At step 1320, a processor 1311 (e.g., processor 120 of FIG. 1 or AP 210 of FIG. 2) of the electronic device 101 may detect fulfillment of a condition for symbol rate change and notify the BT module 1312 of this during the BLC communication.

For example, the processor 1311 may determine that a condition for changing the symbol rate is fulfilled when detecting one of the following events: requesting for transmitting or receiving data greater than a predetermined size, requesting for transmitting or receiving data less than a predetermined size after transmitting/receiving data greater than the predetermined size, execution of an application requiring a different symbol rate communication, receiving a user input requesting for symbol rate change, requesting for decreasing or increasing a data rate, or requesting for supplementary data exchange after receiving advertisement data.

At step 1330, the BT module 1312 may transmit to the neighboring electronic device 102 a symbol rate change request. At step 1340, the BT module 1312 may receive a symbol rate change accept signal from the neighboring electronic device 102 and transfer the symbol rate change accept signal to the processor 1311.

At step 1350, the processor 1311 may determine whether to perform coverage compensation or compensation nullification operation for the symbol rate change.

For example, the processor 1311 may determine the coverage compensation necessity when detecting at least one of the following events: data rate change to the second symbol rate, identifying that the second symbol rate BLE communication has a higher priority, identifying the retransmission rate in the first type symbol rate communication before the symbol rate change is greater than a predetermined value, or identifying that the received signal strength measured in the first type symbol rate communication is less than a predetermined value.

For example, the processor 1311 may determine the compensation nullification necessity when detecting at least one of the following events: requesting for transmitting or receiving data less than a predetermined size is received, identifying that the electronic device moves from a position within the second symbol rage communication coverage to a position within the first symbol rate communication coverage, requesting for changing from the first symbol rate to the second symbol rate is received, requesting for changing to the second symbol rate according to execution of a predetermined application, or identifying that the retransmission rate is greater than a predetermined value or the received signal strength measured is less than a predetermined value after changing the TX power value for coverage compensation for the first symbol rate communication.

At step 1355, the processor 1311 may determine a compensation value for coverage compensation or compensation nullification for use in a symbol rate change operation. For example, the processor 1311 may determine the sensitivity difference between the two symbol rates of 1M sym/s and 2M sym/s as the compensation value and add the compensation value to the TX power to determine the TX power value. The processor 1311 may control the transmit power for Bluetooth communication based on the compensation value. For example, the electronic device 101 may add the compensation value of about 2 dBm for the case of change from 1M sym/s to 2M sym/s and subtract the compensation value of about 2 dBm for the case of change from 2M sym/s to 1M sym/s.

At step 1360, the processor 1311 may send a control signal to the BT module 1312 to change the TX power value based on the compensation value.

At step 1370, the BT module 1312 may adjust the data transmission power for BLE communication according to the control signal received from the processor 1311 and communicate data with the neighboring electronic device at the second symbol rate.

At step 1380, the processor 1311 may determine whether coverage compensation or compensation nullification is necessary and, if necessary, perform the operations of steps 1355 to 1370 depending on the determination result.

Figure 14:
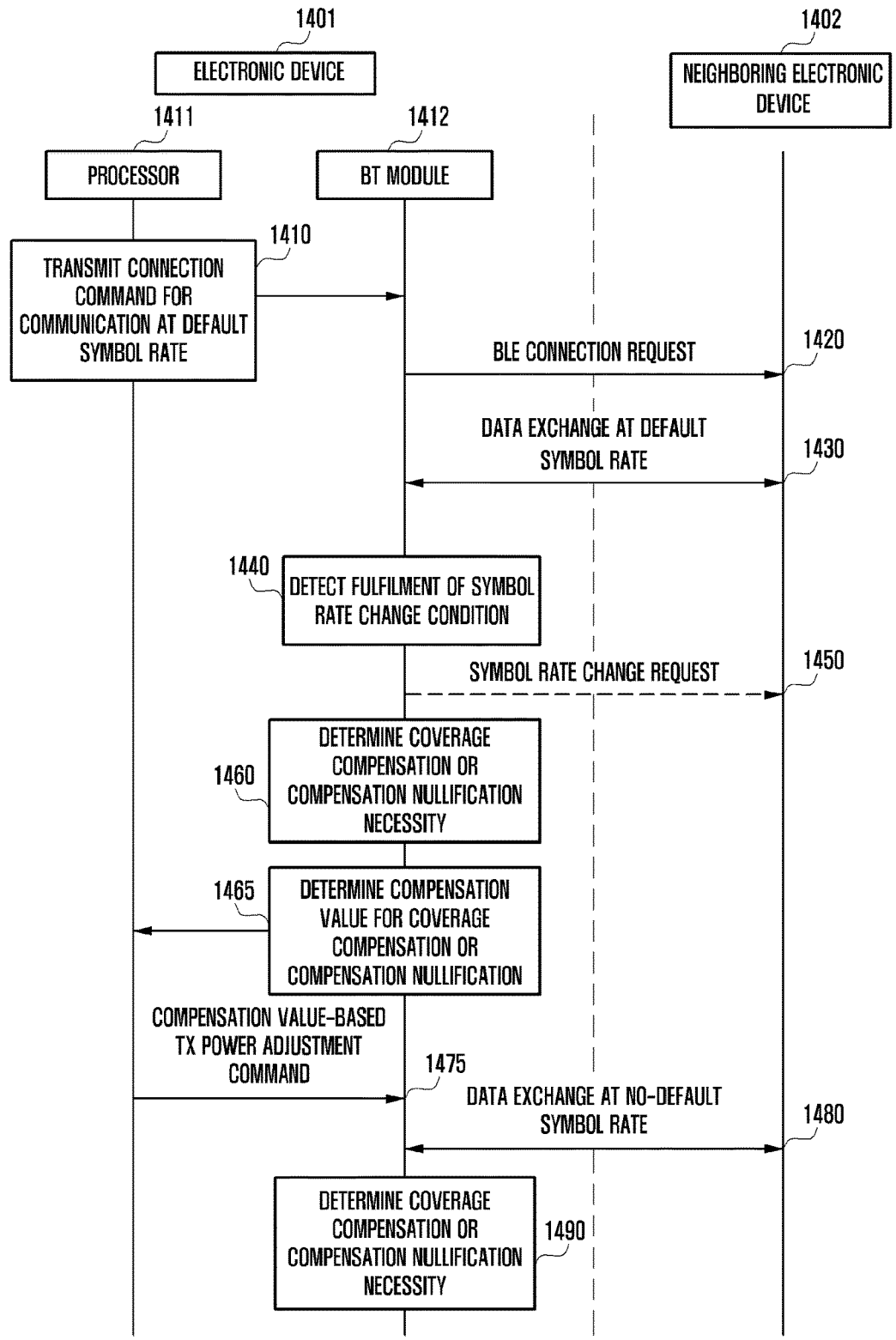
FIG. 14 is a signal flow diagram illustrating signal flows between two electronic devices in a BLE communication coverage compensation method according to various embodiments of the present disclosure.

In reference to FIG. 14, an electronic device 1401 (e.g., electronic device 101 of FIG. 1 or electronic device 201 of FIG. 2) may perform coverage compensation for symbol rate change during the BLE communication with a neighboring electronic device 1402 (e.g., electronic device 102 of FIG. 1).

At step 1410, a processor 1411 (e.g., processor 120 of FIG. 1 and AP 210 of FIG. 2) of the electronic device 1401 may generate a BLE communication channel establishment command indicative of configuring a default symbol rate to a BT module 1412 (e.g., BT module 225 of FIG. 2) upon detection of an event triggering BLE communication.

According to an embodiment of the present disclosure, the processor 1411 may control to receive a Bluetooth signal from the neighboring electronic device 1402 by means of the BT module 1412 or detect a user input for requesting for Bluetooth communication channel establishment or a signal generated along with the execution of an application requiring a Bluetooth connection.

Here, the default symbol rate for Bluetooth communication may be set to, but is not limited to, 1M sym/s or 2M sym/s depending on the hardware configuration of the electronic device.

At step 1420, the BT module 1412 may transmits a BLE connection request signal to the neighboring electronic device 1402 for BLE communication at the default symbol rate. Upon receipt of the BLE connection request signal, the neighboring electronic device 1402 may check the BLE connection request signal for the requested symbol rate by means of its Bluetooth module (not shown) and complete the BLE connection setup based on the check result.

According to an embodiment of the present disclosure, if the default symbol rate of the electronic device 1401 is 1M sym/s, the electronic device 1401 may request to the neighboring electronic device 1402 for BLE connection setup by means of the BT module 1412 and, if the neighboring electronic device 1402 is configured for the 1M sym/s communication, a 1M sym/s communication channel is established between the electronic devices 1401 and 1402. According to an embodiment of the present disclosure, if the default symbol rate is 1M sym/s, this means that 1 Megabits of data are transmitted per 1 second; if the default symbol rate is 2M sym/s, this means that 2 Megabits of data are transmitted per 1 second.

According to an embodiment of the present disclosure, if the default symbol rate of the electronic device 1401 is 2M sym/s, the electronic device 1401 may request to the neighboring electronic device 1402 for connection setup through a 2M sym/s BLE communication channel by means of the BT module 1412 and, if the neighboring electronic device 1402 supports 2M sym/s communication, a 2M sym/s communication channel may be established between the electronic devices 1401 and 1402.

At step 1430, the electronic devices 1401 and 1402 perform BLE data packet communication at the default symbol rate. According to an embodiment of the present disclosure, step 1430 may be omitted; thus step 1420 may be followed by step 1440.

At step 1440, the BT module 1412 of the electronic device 1401 may detect fulfillment of a symbol rate change condition.

According to an embodiment of the present disclosure, the BT module 1412 may detects the fulfillment of a symbol rate change condition when the electronic devices 1401 and 1402 support the 2M sym/s but are communicating at a symbol rate that is not the 2M sym/s.

According to an embodiment of the present disclosure, the BT module 1412 may detect the fulfillment of a symbol rate change condition when detecting at least one of the following events: requesting for transmission or reception of data larger than a predetermined size, detecting a user input for requesting for symbol rate change, execution of an application requiring symbol rate change, requesting for data rate increase, or requesting for supplementary data exchange after receipt of data.

According to various embodiments of the present disclosure, the operation of step 1430 may be performed after step 1440, i.e., the BT module 1412 may be configured to perform the operation of step 1440 and then the operation of step 1430.

At step 1450, the BT module 1412 of the electronic device 1401 may transmit to the neighboring electronic device 1402 a symbol rate change request signal upon detection of the fulfillment of the symbol rate change condition. For example, the electronic device 1401 may request for symbol rate change from the first to second symbol rate or inquire to the neighboring electronic device 1402 whether it supports symbol rate change from the first to the second symbol rate.

At step 1460, the BT module 1412 of the electronic device 1401 may determine whether coverage compensation or compensation nullification is used for the symbol rate change to the target symbol rate.

For example, the BT module 1412 may determine the coverage compensation necessity when detecting at least one of the following events: changing the symbol rate from 1M sym/s to 2M sym/s, detecting that the retransmission rate in the first type symbol rate (i.e., 1M sym/s) communication is greater than a predetermined value, and detecting that the received signal strength measured in the first type symbol rate (i.e., 1M sym/s) communication is less than a predetermined value.

For example, the BT module 1412 may determine the coverage compensation nullification necessity when detecting at least one of the following events: detecting a request for transmitting or receiving data less than a predetermined size, detecting location change of the electronic device 1401 from the 2M sym/s communication coverage to the 1M sym/s communication coverage, detecting a user input requesting for symbol rate change from the second to first symbol rate, detecting execution of a predetermined application requiring communication at the first symbol rate after symbol rate change, or detecting that the number of retransmissions becomes less than a predetermined value or the reception sensitivity is greater than a predetermined value after changing the TX power value for coverage compensation.

At step 1465, the BT module 1412 may determine the compensation value for coverage compensation or compensation nullification and send the compensation value to the processor 1411. For example, the electronic device 1401 may determine the sensitivity difference between the two symbol rates of 1M sym/s and 2M sym/s as the compensation value and add (or apply) or subtract (nullify) the compensation value to or from the TX power to determine the TX power value. The electronic device 1401 may control the TX power for Bluetooth communication based on the compensation value. For example, the electronic device 1401 may add a compensation value of about 2 dBm for the case of change from 1M sym/s to 2M sym/s and subtract a compensation value of about 2 dBm for the case of change from 2M sym/s to 1M sym/s.

At step 1475, the processor 1411 of the electronic device 1401 may transmit to the BT module 1412 a control signal indicative of changing the TX power based on the compensation value, and the BT module 1412 may adjust the TX power for BLE data communication with the neighboring electronic device 1402 based on the control signal.

For example, in the case of changing the symbol rate from the 1 Msym/s to 2 Msym/s in the course of the BLE communication, the electronic device 1401 may increase the TX power by adding a power increment value to the TX power configured for 1 Msym/s symbol rate communion.

At step 1480, the BT module 1412 of the electronic device 1401 may change the symbol rate to perform data communication over the BLE communication link at the changed symbol rate.

According to various embodiments of the present disclosure, the BT module 1412 transmits to the neighboring electronic device 1402 a coverage compensation request according to the symbol rate change determination. The neighboring electronic device 1402 may perform the operations of steps 1460 and 1465 to change the symbol rate in response to the coverage compensation request from the electronic device 1401.

At step 1490, the BT module 1412 may determine whether coverage compensation or compensation nullification is necessary at a predetermined interval or in real time and perform repetitively the operations of steps 1460 to 1480 according to the determination result.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

a housing;

a radio communication circuit arranged in the housing and configured to support radio communication using a short range wireless communication protocol with a neighboring electronic device;

a processor arranged in the housing and electrically connected to the radio communication circuit; and a memory arranged in the housing and electrically connected to the processor, the memory storing instructions that, when executed by the processor, cause the processor to:

perform a radio communication with the neighboring electronic device using the radio communication circuit at a first symbol rate, change, when detecting an event triggering a change from the first symbol rate to a second symbol rate, from the first symbol rate to the second symbol rate, determine a compensation value based on a coverage range defined by data propagation distance at the second symbol rate, and adjust a transmit power of the radio communication circuit based on the compensation value.

2. The electronic device of claim 1, wherein the memory further stores instructions that, when executed by the processor, cause the processor to:

control the radio communication circuit to transmit a capability inquiry signal inquiring whether the neighboring electronic device supports a radio communication at the second symbol rate, receive, from the neighboring electronic device, an inquiry response signal indicative of support of the radio communication at the second symbol rate, and establish a communication link for communication with the neighboring electronic device at the second symbol rate upon receipt of the inquiry response signal.

3. The electronic device of claim 1, wherein:

the radio communication is a Bluetooth low energy (BLE) communication, and the memory further stores instructions that, when executed by the processor, cause the processor to determine a coverage compensation necessity when detecting at least one of:

an event of requesting for a symbol rate change from the first symbol rate to the second symbol rate during the communication with the neighboring electronic device at the first symbol rate, an event of detecting that a data retransmission rate measured in the communication at the first symbol rate is greater than a predetermined value, an event of detecting that the second symbol rate has a high configuration priority, or an event of detecting that a received signal strength measured during the communication at the first symbol rate is less than a predetermined value.

4. The electronic device of claim 3, wherein the event of requesting for a symbol rate change to the second symbol rate comprises at least one of:

an event of requesting for transmitting or receiving data greater than a predetermined size, an event of receiving a user input for changing from the first symbol rate to the second symbol rate, an event of detecting execution of an application requiring communication at the second symbol rate, an event of requesting for increase of a data rate, or an event of requesting a supplementary data exchange after receipt of data.

5. The electronic device of claim 1, wherein the first symbol rate and the second symbol rate are different from each other in data propagation distance and data rate.

6. The electronic device of claim 3, wherein the memory further stores instructions that, when executed by the processor, cause the processor to increase, when the coverage compensation necessity is determined to require extension of the coverage range, a radius of the coverage range for communication at the second symbol rate by increasing the transmit power of the radio communication circuit.

7. The electronic device of claim 3, wherein the memory further stores instructions that, when executed by the processor, cause the processor to decrease, when the coverage compensation necessity is determined to require reduction of the coverage range, a radius of the coverage range for communication at the second symbol rate by decreasing the transmit power of the radio communication circuit.

8. The electronic device of claim 1, wherein the memory further stores instructions that, when executed by the processor, cause the processor to decrease, when detecting a need to change from the second symbol rate to the first symbol rate after changing from the first symbol rate to the second symbol rate, the transmit power of the radio communication circuit based on the compensation value determined according to a response to a symbol rate change to the first symbol rate.

9. The electronic device of claim 8, wherein detecting the need to change from the second symbol rate to the first symbol rate comprises at least one of:

an event of requesting for transmitting or receiving data less than a predetermined size, an event of detecting a change of location of the electronic device moving toward a place requiring reduction of the coverage range, an event of detecting a user input requesting for a change to the first symbol rate after the change to the second symbol rate, an event of detecting execution of an application requiring communication at the first symbol rate after the symbol rate change, an event of detecting that a data retransmission rate, measured after changing the transmit power, is less than a predetermined value, or an event of detecting that a reception sensibility is equal to or greater than a predetermined value.

10. The electronic device of claim 1, wherein:

the first symbol rate is one of 1M sym/s or 2M sym/s, the second symbol rate is one of 1M sym/s or 2M sym/s, and the first symbol rate and second symbol rate are different from each other.

11. The electronic device of claim 1, wherein the memory further stores instructions that, when executed by the processor, cause the processor to:

determine whether a coverage compensation or compensation nullification is necessary based on the compensation value for compensating the coverage range after establishing a communication for communication at the second symbol rate, and perform an operation of repetitively increasing or decreasing the transmit power accordingly.

12. An electronic device comprising:

a housing;

a radio communication circuit arranged in the housing and configured to support radio communication with a neighboring electronic device;

a processor arranged in the housing and electrically connected to the radio communication circuit; and
a memory arranged in the housing and electrically connected to the processor, the memory storing instructions that, when executed by the processor, cause the processor to:
control the radio communication circuit for Bluetooth low energy (BLE) communication with a neighboring electronic device at a default symbol rate,
change, when a data rate change event is detected, from the default symbol rate to a non-default symbol rate,
determine a compensation value based on a coverage range defined by a data propagation distance at the non-default symbol rate, and
adjust a transmit power of the radio communication circuit based on the compensation value.

13. The electronic device of claim 12, wherein the memory further stores instructions that, when executed by the processor, cause the processor to:
transmit a capability inquiry signal inquiring whether the neighboring electronic device supports a radio communication at the non-default symbol rate,
receive an inquiry response signal from the neighboring electronic device indicative of support of the radio communication at the non-default symbol rate, and
establish a communication link for communication with the neighboring electronic device at the non-default symbol rate upon receipt of the inquiry response signal.

14. The electronic device of claim 12, wherein the memory further stores instructions that, when executed by the processor, cause the processor to determine whether coverage compensation or compensation nullification is necessary for the symbol rate change in response to an event of requesting the symbol rate change to the non-default symbol rate during BLE communication with the neighboring electronic device at the default symbol rate.

15. The electronic device of claim 14, wherein the memory further stores instructions that, when executed by the processor, cause the processor to:
determine a coverage compensation necessity when detecting at least one of:
an event of detecting that a data retransmission rate measured in the communication at the default symbol rate is greater than a predetermined value,
an event of detecting that the non-default symbol rate has a high configuration priority, or
an event of detecting that a received signal strength measured during the communication at the default symbol rate is less than a predetermined value, and
determine a compensation nullification necessity when detecting at least one of:
an event of requesting for transmitting or receiving data less than a predetermined size,
an event of detecting a change of location of the electronic device moving toward a place requiring reduction of the coverage range ,
an event of detecting that a data retransmission rate, measured after changing the transmit power, is less than a predetermined value,
an event of detecting a request for changing to the default symbol rate after the symbol rate change, or
an event of detecting that a reception sensibility is equal to or greater than a predetermined value.

16. The electronic device of claim 15, wherein the memory further stores instructions that, when executed by the processor, cause the processor to increase, when the coverage compensation necessity is determined, a radius of the coverage range for communication at the changed symbol rate by increasing the transmit power of the radio communication circuit.

17. The electronic device of claim 15, wherein the memory further stores instructions that, when executed by the processor, cause the processor to decrease, when the compensation nullification necessity is determined, a radius of the coverage range by decreasing the transmit power of the radio communication circuit.

18. The electronic device of claim 12, wherein the memory further stores instructions that, when executed by the processor, cause the processor to:
determine a necessity of coverage compensation or compensation nullification based on the compensation value after establishing a connection for communication at the changed symbol rate, and
perform an operation of coverage compensation or compensation nullification by repetitively increasing or decreasing the transmit power accordingly.

19. The electronic device of claim 12, where the memory further stores instructions that, when executed by the processor, cause the processor to:
receive, from the neighboring electronic device:
a transmit power adjustment value, and
a request to change a symbol rate to the non-default symbol rate, and
determine the compensation value based on the transmit power adjustment value.

20. The electronic device of claim 18, wherein the memory further stores instructions that, when executed by the processor, cause the processor to:
decrease the transmit power according to the necessity of the compensation nullification,
determine whether an additional nullification is necessary, and
perform again, when the additional nullification is necessary, the operation of compensation nullification.

* * * * *